(12) United States Patent
Zhou et al.

(10) Patent No.: US 10,364,364 B2
(45) Date of Patent: Jul. 30, 2019

(54) PHOTO CURABLE INK COMPOSITION

(71) Applicant: Hewlett-Packard Development Company, L.P., Houston, TX (US)

(72) Inventors: Zhang-Lin Zhou, San Diego, CA (US); Yubai Bi, San Diego, CA (US); Or Brandstein, San Diego, CA (US); Rodney David Stramel, San Diego, CA (US); Gregg A. Lane, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/740,268

(22) PCT Filed: Oct. 29, 2015

(86) PCT No.: PCT/US2015/058082
§ 371 (c)(1),
(2) Date: Dec. 27, 2017

(87) PCT Pub. No.: WO2017/074394
PCT Pub. Date: May 4, 2017

(65) Prior Publication Data
US 2018/0194955 A1    Jul. 12, 2018

(51) Int. Cl.
*C09D 11/101* (2014.01)
*C09D 11/38* (2014.01)
(Continued)

(52) U.S. Cl.
CPC ......... *C09D 11/101* (2013.01); *C09D 11/102* (2013.01); *C09D 11/38* (2013.01); *C08G 65/3328* (2013.01); *C08G 65/33327* (2013.01)

(58) Field of Classification Search
CPC .................................... C09D 11/101
See application file for complete search history.

(56) References Cited

U.S. PATENT DOCUMENTS

| 4,602,097 A | 7/1986 | Curtis |
| 4,719,297 A * | 1/1988 | Henne ............ C07F 9/307 |
| | | 522/31 |

(Continued)

FOREIGN PATENT DOCUMENTS

| JP | H0426687 B2 * | 5/1992 | ............ G01B 5/06 |
| WO | WO 2008/061954 | 5/2008 | |

(Continued)

OTHER PUBLICATIONS

Muller, G et al "Simple One-Pot Syntheses of Water-Soluble Bis(acyl)phosphane Oxide Photoinitiators and Their Application in Surfactant-Free Emulsion Plymerization" Macromolecular Rapid Communications, 2015, 36, pp. 553-557.

(Continued)

*Primary Examiner* — Shelby L Fidler
(74) *Attorney, Agent, or Firm* — Dierker & Kavanaugh PC

(57) ABSTRACT

A photo curable ink composition includes a photo-reactive binder, a water soluble polymeric sensitizer, a water soluble photoinitiator, a colorant, and a balance of water. The water soluble polymeric sensitizer includes a functionalized anthrone moiety, a polyether chain, and an amide linkage or an ether linkage attaching one end of the polyether chain to the functionalized anthrone moiety. The water soluble photoinitiator having a formula (I) of: wherein n is any integer from 1 to 5 and M is a metal with a valence from 1 to 5.

20 Claims, 3 Drawing Sheets

(51) Int. Cl.
    *C09D 11/102*     (2014.01)
    *C08G 65/332*     (2006.01)
    *C08G 65/333*     (2006.01)

(56) References Cited

U.S. PATENT DOCUMENTS

| | | |
|---|---|---|
| 7,790,245 B2 | 9/2010 | Oyanagi et al. |
| 7,976,148 B2 | 7/2011 | Kishi et al. |
| 8,052,270 B2 | 11/2011 | Nakamura et al. |
| 8,604,251 B2 | 12/2013 | Berens et al. |
| 8,664,291 B2 | 3/2014 | Kida et al. |
| 8,852,727 B2 | 10/2014 | Nakamura et al. |
| 8,905,533 B2 | 12/2014 | Shimohara et al. |
| 9,133,354 B2 | 9/2015 | Belelie et al. |
| 2004/0209976 A1 | 10/2004 | Nakhmanovich et al. |
| 2011/0195198 A1 | 8/2011 | Loccufier et al. |
| 2014/0242353 A1* | 8/2014 | Nakano .................. C09D 11/06 428/195.1 |
| 2014/0362150 A1 | 12/2014 | Yamashita et al. |
| 2015/0315394 A1* | 11/2015 | Miura .................. C09D 11/101 347/102 |

FOREIGN PATENT DOCUMENTS

| | | | |
|---|---|---|---|
| WO | WO-2013146062 A1 * | 10/2013 | ........... C09D 11/101 |
| WO | WO-2014/009194 | 1/2014 | |

OTHER PUBLICATIONS

International Search Report and Written Opinion for International Application No. PCT/US2015/058082 dated Feb. 19, 2016, 9 pages.

\* cited by examiner

PHOTO CURABLE INK COMPOSITION

BACKGROUND

Curing of ink by radiation, and in particular by ultraviolet (UV) radiation, has become popular. UV curable inks often include monomers and photoinitiators. These monomers are often those capable of free radical polymerization. The growing end of each polymer chain is a radical that reacts with additional monomers, transferring the radical to the end of the chain as each monomer is added. The photoinitiator is used to form the first radicals to begin the polymerization process. As an example, the photoinitiator is capable of absorbing UV light to generate radicals to react with the monomers.

Two types of photoinitiators can be used in UV curable compositions. Type I photoinitiators are unimolecular photoinitiators that undergo a hemolytic bond cleavage upon absorption of UV light, forming radicals. Type-II photoinitiators are bimolecular photoinitiators. Type-II photoinitiators are a system that includes a photoinitiator with a co-initiator (such as a synergist or sensitizer), which together can form radicals upon exposure to UV light. With type-II photoinitiators, radicals are generated in a bimolecular process that involves the reduction of the photoexcited compound(s) by hydrogen abstraction, by energy transfer, or by electron transfer.

BRIEF DESCRIPTION OF THE DRAWINGS

Features of examples of the present disclosure will become apparent by reference to the following detailed description and drawings, in which like reference numerals correspond to similar, though perhaps not identical, components.

DETAILED DESCRIPTION

Figure 1:
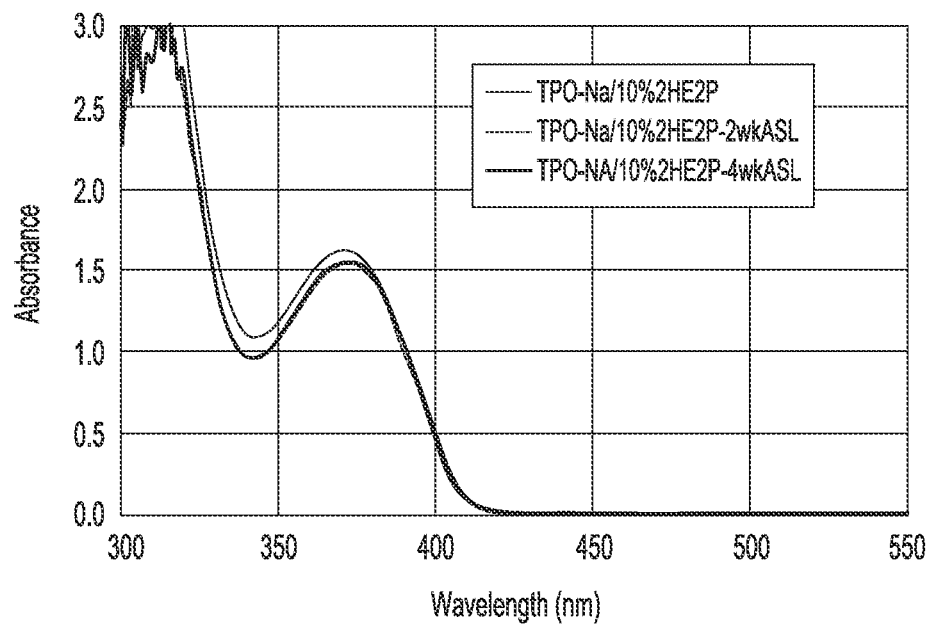
FIG. 1 is a graph illustrating the stability of a trimethylbenzoylphenylphosphinic acid sodium salt (TPO-Na) photoinitiator disclosed herein.

The inkjet printing industry uses various types of inks, such as oil-based inks, solvent-based (non-aqueous) inks, water-based (aqueous) inks, and solid inks which are melted in preparation for dispensing. Solvent-based inks are fast drying, and as a result, are widely used for industrial printing. When solvent-based inks containing binders and other ingredients are jetted onto a substrate, the solvent(s) partially or fully evaporate from the ink, leaving the binder and other ingredients, such as pigment particles, on the printed substrate in the form of a dry film. During the drying process, the solvents, which are often volatile organic compounds (VOC), emit undesirable vapors. Vapor production can increase greatly with higher printing speeds or for wide format images, where large amounts of ink are deposited onto a substrate. As a result of this and other concerns, efforts have been made to prepare water-based inks.

However, radiation-curable (or photo-curable) water-based ink compositions are noticeably limited among available options due, at least in part, to their specific formulation properties and available photoinitiators. For example, many photoinitiators are water insoluble, and thus are difficult to formulate in a water-based ink composition. For another example, some photoinitiators decompose in the water-based ink vehicle, and thus are unstable in a water-based ink composition. For still another example, some photoinitiators undesirably migrate throughout cured materials (e.g., and thus can leach out of the cured material). For yet a further example, some photoinitiators are not absorbing at a 395 nm wavelength (which is common wavelength for UV LED lamps). Still further, some radiation-curable (or photo-curable) water-based ink compositions do not cure efficiently.

Examples of the photo curable ink composition disclosed herein are aqueous inks that include examples of a water soluble photoinitiator and a water soluble polymeric sensitizer. Together, the water soluble photoinitiator(s) and water soluble polymeric sensitizer(s) form a photo initiating system that is chemically stable (i.e., resistant to decomposition) in the basic conditions of the ink, resists migration in and from the cured ink film, is active at the 395 nm wavelength, and exhibits curing efficiency comparable with highly-reactive non-water soluble photoinitiators (such as IRGACURE® 819 (BASF Corp.)).

In addition to the water soluble photoinitiator(s) and water soluble polymeric sensitizer(s), the photo curable ink composition may include a photo-reactive binder (which undergoes cross-linking polymerization during curing), a colorant, and water. The photo curable ink composition may also include other additives, which will be described in more detail below.

The water soluble photoinitiator is a trimethylbenzoylphenylphosphinic acid metal salt (i.e., TPO salt) having a formula (I) of:

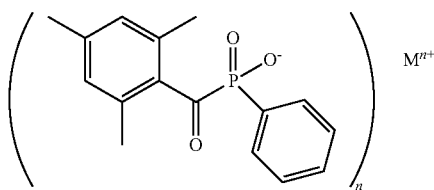

where n is any integer from 1 to 5 and M is a metal with a valence from 1 to 5. Examples of suitable metals include Li, Na, K, Cs, Rb, Be, Mg, Ca, Ba, Al, Ge, Sn, Pb, As, and Sb.

The TPO salt may be formed from ethyl (2,4,6-trimethylbenzoyl) phenylphosphinate (TPO-L) and a metal salt. The ethyl (2,4,6-trimethylbenzoyl) phenylphosphinate may be added to a suitable solvent (e.g., methyl ethyl ketone (MEK)) to form a solution, and then the metal salt may be added to the solution. The solution may be heated and stirred at a predetermined temperature for a predetermined time to allow the reaction to take place. As a result of the reaction, a solid TPO salt forms. This solid may be collected, washed, and dried. Two example synthetic pathways for forming a lithium TPO salt (TPO-Li) and a sodium TPO salt (TPO-Na) are shown in schemes A and B:

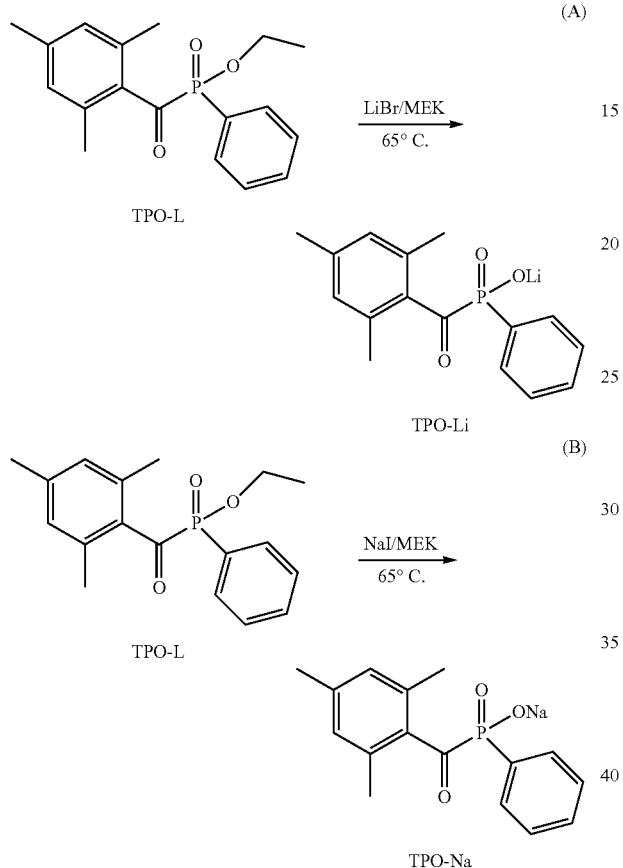

For scheme A, from about 0.1 mol of ethyl (2,4,6-trimethylbenzoyl) phenylphosphinate is introduced into 600 ml of ethyl methyl ketone (MEK). Then 4 equivalents of 0.4 mol of lithium bromide is added to the solution. After about 15 minutes, the homogeneous solution is heated and stirred for 24 hours. In an example, the solution is heated in a 65° C. oil bath on a hotplate. A white solid (in this example TPO-Li) is formed. The mixture can be cooled to room temperature, and the white solid collected by vacuum filtration or some other suitable process. The white solid may be washed with petroleum ether (250 ml, three times) using stirring for about 30 minutes inside a beaker. The white solid may then be dried in an oven. As an example, the TPO-Li yield may be 89%.

For scheme B, from about 0.4 mol of ethyl (2,4,6-trimethylbenzoyl) phenylphosphinate is introduced into 600 ml of ethyl methyl ketone (MEK). Then 1.1 equivalents of 0.46 mol of sodium iodide is added to the solution. After about 15 minutes, the homogeneous solution is heated and stirred for 24 hours. In an example, the solution is heated in a 65° C. oil bath on a hotplate. A white solid (in this example TPO-Na) is formed. The mixture can be cooled to room temperature, and the white solid collected by vacuum filtration or some other suitable process. The white solid may be washed with petroleum ether (500 ml, three times) using stirring inside a beaker. The white solid may then be dried in an oven. As an example, the TPO-Na yield may be 90%.

The water soluble photoinitiator may be present in the photo curable ink composition in an amount ranging from about 0.1 wt % to about 10 wt % based on a total wt % of the photo curable ink composition.

The solubility of the water soluble photoinitiator disclosed herein is high. In one example, the water soluble photoinitiator can have a water solubility of at least 0.1 wt %. When the water solubility is at least 0.1 wt %, it means that of the total wt % of the water soluble photoinitiator added to water, at least 0.1 wt % of the total is water soluble. In some instances, the water soluble photoinitiator may have a water solubility of at least 0.5 wt %. In some instances, the water soluble photoinitiator may have a water solubility up to about 20 wt %. It is believed that higher water solubility, potentially up to 100 wt %, may also be achieved.

The water soluble photoinitiator disclosed herein is also chemically stable in the photo curable ink composition (at basic conditions, i.e., a pH greater than 7 to about 14) because it does not decompose. Additionally, while the water soluble photoinitiator alone may not be highly reactive, in combination with the water soluble polymeric sensitizer disclosed herein, the resulting photo initiating system is highly reactive and exhibits desirable curing efficiency.

The water soluble polymeric sensitizer includes a functionalized anthrone moiety, a polyether chain, and an amide linkage or an ether linkage attaching one end of the polyether chain to the functionalized anthrone moiety. Each component of the polymeric sensitizer is discussed in greater detail below.

One portion of the polymeric sensitizer is the functionalized anthrone moiety. As used herein, the "functionalized anthrone moiety" has the formula:

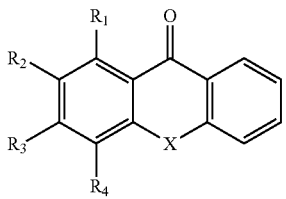

where X can be S, O, or NH. When X=S, the functionalized anthrone moiety is thioxanthrenone, when X=O, the functionalized anthrone moiety is xanthenone, and when X=NH, the functionalized anthrone moiety is acridinone. $R_1$, $R_2$, $R_3$, and $R_4$ are each independently selected from the group consisting of a hydrogen atom, a substituted or unsubstituted alkyl group, a substituted or unsubstituted allyl group, a substituted or unsubstituted alkene or alkenyl group, a substituted or unsubstituted aryl group, a substituted or unsubstituted aralkyl group, a halogen atom, $-NO_2$, $-O-R_d$, $-CO-R_d$, $-CO-O-R_d$, $-O-CO-R_d$, $-CO-NR_dR_e$, $-NR_dR_e$, $-NR_d-CO-R_e$, $-NR_d-CO-O-R_e$, $-NR_d-CO-NR_eR_f$, $-SR_d$, $-SO-R_d$, $-SO_2-R_d$, $-SO_2-O-R_d$, $-SO_2NR_dR_e$ and a perfluoroalkyl group; and $R_d$, $R_e$, and $R_f$ are each independently selected from the group consisting of a hydrogen atom, a substituted or unsubstituted alkyl group, a substituted or unsubstituted allyl group, a substituted or unsubstituted alkene or alkenyl group, a substituted or unsubstituted aryl group, and a substituted or unsubstituted aralkyl group.

The other portion of the polymeric sensitizer disclosed herein includes polyether chain(s). Suitable examples of the polyether chains include polyethylene glycol or methyl substituted polyethylene glycol. In an example, one end of the polyether chain is attached to the functionalized anthrone moiety through an amide linkage or an ether linkage. The molecular weight of the polyether chain can, in some cases, affect the solubility of the final polymeric sensitizer. For example, a higher ratio of oxygen atoms to carbon atoms in the polyether chain tends to render the polymeric sensitizer more water soluble. The molecular weight of the polyether chain can also affect the degree to which the polymeric sensitizer can migrate in the cured ink. Longer polyether chains can make it more difficult for the polymeric sensitizer to move within the cured ink, thus decreasing migration. Therefore, the molecular weight and length of the polyether chain can be selected to provide good water solubility and low or no migration of the polymeric sensitizer in cured ink.

As noted above, the amide linkage or the ether linkage connects the polyether chain to the functionalized anthrone moiety. It has been found that the polymeric sensitizer disclosed herein is hydrolytically stable due to the amide or ether linkage, especially when compared to sensitizers including an ester linkage. As such, the amide or ether linkage improves the stability of the polymeric sensitizer in the water based photo curable ink composition.

As used herein, "amide linkage" refers to either an amide group or an amide group with a bridging group (shown in some formulas as "Y") attached to the carbon atom of the amide group. The amide linkage connects one of the end benzene rings of the functionalized anthrone moiety with the polyether chain. The polyether chain may be directly bonded to the nitrogen atom of the amide group, and the carbon atom of the amide group may either be directly bonded, or linked through the bridging group to a carbon atom in the one benzene ring of the functionalized anthrone moiety. It is to be understood that the amide linkage may be attached to the functionalized anthrone moiety at different positions on the one benzene ring. For example, the carbon atom of the amide group, or the carbon atom of the bridging group may be attached to the carbon atom at the ortho position, meta position, or the para position of the ring. The position at which the amide linkage is attached depends, in part, on the starting material used as the functionalized anthrone moiety when forming the polymeric sensitizer. The amide linkage can be formed by a suitable reaction, such as a substitution reaction or a condensation reaction.

As used herein, "ether linkage" refers to the ether group (i.e., R'—O—R") that connects one of the end benzene rings of the functionalized anthrone moiety with the polyether chain. R' and R" of the ether linkage may be part of the functionalized anthrone moiety and the polyether chain, respectively. For example, the R' of the ether linkage may be one of the carbon atoms in the one benzene ring and the R" of the ether linkage may be the carbon atom at one end of the polyether chain. It is to be understood that the ether linkage may be attached to the functionalized anthrone moiety at different positions on the one benzene ring. For example, the R' carbon atom of the ether linkage may be the carbon atom at the ortho position, meta position, or the para position of the ring. The position at which the ether linkage is attached depends, in part, on the starting material used as the functionalized anthrone moiety when forming the polymeric sensitizer. The ether linkage can be formed by a suitable reaction, such as a substitution reaction.

In some examples, the functionalized anthrone moiety, polyether chain, and amide or ether linkage do not form the entire polymeric sensitizer. In some examples, the polymeric sensitizer may include additional functionalized anthrone moieties and/or polyether chains. In some other examples, the polymeric sensitizer may have functional group(s) attached to an opposed end of the polyether chain.

In one example, the polymeric sensitizer has a formula (II) of:

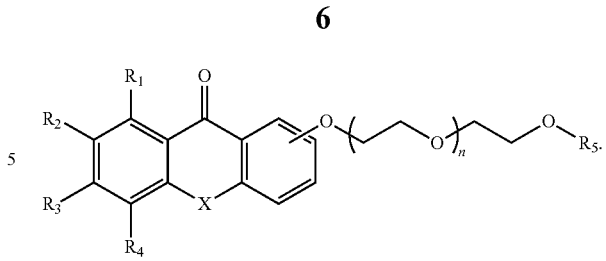

In formula (II), $R_1$, $R_2$, $R_3$, $R_4$, and $R_5$ are each independently selected from the group consisting of a hydrogen atom, a substituted or unsubstituted alkyl group, a substituted or unsubstituted allyl group, a substituted or unsubstituted alkene or alkenyl group, a substituted or unsubstituted aryl group, a substituted or unsubstituted aralkyl group, a halogen atom, $-NO_2$, $-O-R_d$, $-CO-R_d$, $-CO-O-R_d$, $-O-CO-R_d$, $-CO-NR_dR_e$, $-NR_dR_e$, $-NR_d-CO-R_e$, $-NR_d-CO-O-R_e$, $-NR_d-CO-NR_eR_f$, $-SR_d$, $-SO-R_d$, $-SO_2-R_d$, $-SO_2-O-R_d$, $-SO_2NR_dR_e$ and a perfluoroalkyl group. $R_d$, $R_e$, and $R_f$ are each independently selected from the group consisting of a hydrogen atom, a substituted or unsubstituted alkyl group, a substituted or unsubstituted allyl group, a substituted or unsubstituted alkene or alkenyl group, a substituted or unsubstituted aryl group, and a substituted or unsubstituted aralkyl group. Some examples of suitable alkyl groups include methyl, ethyl, propyl, isopropyl, butyl, isobutyl, pentyl, hexyl, etc. One example of a suitable alkene group is an ethylene group. Some examples of suitable aryl groups include phenyl, phenylmethyl, etc. In formula (II), X is O, S, or NH and the polyether chain has n number of repeating monomer units, where n ranges from 1 to 200. As depicted in formula (II), the linkage is an ether linkage.

In another example, the polymeric sensitizer has a formula (III) of:

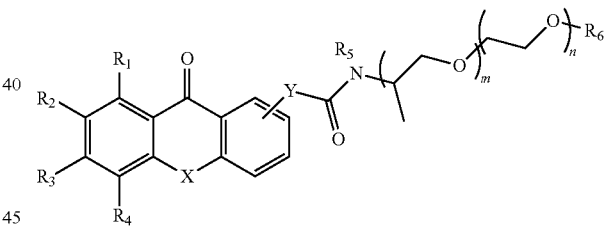

In formula (III), $R_1$, $R_2$, $R_3$, $R_4$, $R_5$, and $R_6$ are each independently selected from the group consisting of a hydrogen atom, a substituted or unsubstituted alkyl group, a substituted or unsubstituted allyl group, a substituted or unsubstituted alkene or alkenyl group, a substituted or unsubstituted aryl group, a substituted or unsubstituted aralkyl group, a halogen atom, $-NO_2$, $-O-R_d$, $-CO-R_d$, $-CO-O-R_d$, $-O-CO-R_d$, $-CO-NR_dR_e$, $-NR_dR_e$, $-NR_d-CO-R_e$, $-NR_d-CO-O-R_e$, $-NR_d-CO-NR_eR_f$, $-SR_d$, $-SO-R_d$, $-SO_2-R_d$, $-SO_2-O-R_d$, $-SO_2NR_dR_e$ and a perfluoroalkyl group. $R_d$, $R_e$, and $R_f$ are each independently selected from the group consisting of a hydrogen atom, a substituted or unsubstituted alkyl group, a substituted or unsubstituted allyl group, a substituted or unsubstituted alkene or alkenyl group, a substituted or unsubstituted aryl group, and a substituted or unsubstituted aralkyl group. Some examples of suitable alkyl groups include methyl, ethyl, propyl, isopropyl, butyl, isobutyl, pentyl, hexyl, etc. One example of a suitable alkene group is an ethylene group. Some examples of suitable aryl groups include phenyl, phenylmethyl, etc. In formula (III), X is O, S, or NH, Y is a bond, $(CH_2)_q$, or $O(CH_2)_q$, where q is any integer from 1 to 100, the first polyether chain has m number of repeating monomer units, where m ranges from 1 to 200, and the second polyether chain has n number of repeating monomer units, where n ranges from 1 to 200. As depicted in formula (III), the linkage is an amide linkage.

In other examples, the polymeric sensitizer includes an additional functionalized anthrone moiety attached to the opposed end of the polyether chain through an additional ether linkage or an additional amide linkage.

In one example, the polymeric sensitizer has the formula (IV) of:

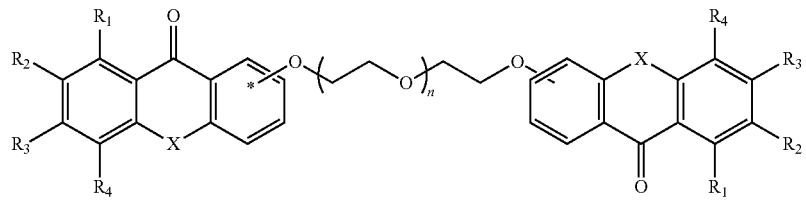

which includes the additional functionalized anthrone moiety attached to the opposed end of the polyether chain through the additional ether linkage.

In formula (IV), $R_1$, $R_2$, $R_3$, and $R_4$ are each independently selected from the group consisting of a hydrogen atom, a substituted or unsubstituted alkyl group, a substituted or unsubstituted allyl group, a substituted or unsubstituted alkene or alkenyl group, a substituted or unsubstituted aryl group, a substituted or unsubstituted aralkyl group, a halogen atom, —$NO_2$, —O—$R_d$, —CO—$R_d$, —CO—O—$R_d$, —O—CO—$R_d$, —CO—$NR_dR_e$, —$NR_dR_e$, —$NR_d$—CO—$R_e$, —$NR_d$—CO—O—$R_e$, —$NR_d$—CO—$NR_eR_f$, —$SR_d$, —SO—$R_d$, —$SO_2$—$R_d$, —$SO_2$—O—$R_d$, —$SO_2NR_dR_e$ and a perfluoroalkyl group. $R_d$, $R_e$, and $R_f$ are each independently selected from the group consisting of a hydrogen atom, a substituted or unsubstituted alkyl group, a substituted or unsubstituted allyl group, a substituted or unsubstituted alkene or alkenyl group, a substituted or unsubstituted aryl group, and a substituted or unsubstituted aralkyl group. As mentioned above, some examples of suitable alkyl groups include methyl, ethyl, propyl, isopropyl, butyl, isobutyl, pentyl, hexyl, etc.; an example of a suitable alkene group is an ethylene group; and some examples of suitable aryl groups include phenyl, phenylmethyl, etc. It is to be understood that these groups may be used in any of the formulas disclosed herein. In formula (IV), X is O, S, or NH and the polyether chain has n number of repeating monomer units, where n ranges from 1 to 200.

In another example, the polymeric sensitizer has the formula (V) of:

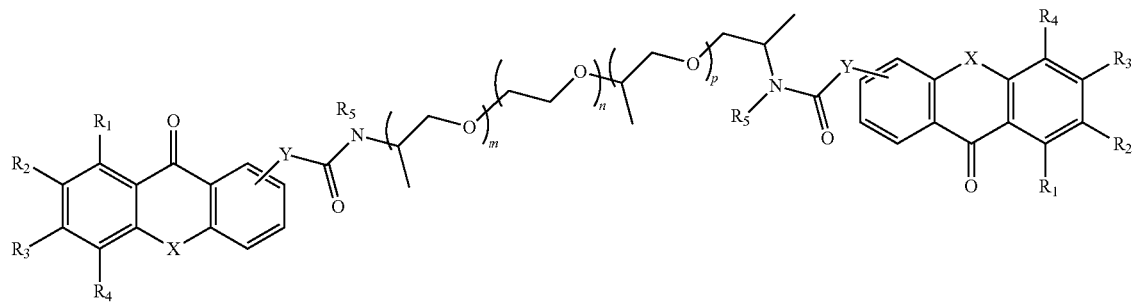

which includes the additional functionalized anthrone moiety attached to the opposed end of the polyether chain through the additional amide linkage.

In formula (V), $R_1$, $R_2$, $R_3$, $R_4$, and $R_5$ are each independently selected from the group consisting of a hydrogen atom, a substituted or unsubstituted alkyl group, a substituted or unsubstituted allyl group, a substituted or unsubstituted alkene or alkenyl group, a substituted or unsubstituted aryl group, a substituted or unsubstituted aralkyl group, a halogen atom, —$NO_2$, —O—$R_d$, —CO—$R_d$, —CO—O—$R_d$, —O—CO—$R_d$, —CO—$NR_dR_e$, —$NR_dR_e$, —$NR_d$—CO—$R_e$, —$NR_d$—CO—O—$R_e$, —$NR_d$—CO—$NR_eR_f$, —$SR_d$, —SO—$R_d$, —$SO_2$—$R_d$, —$SO_2$—O—$R_d$, —$SO_2NR_dR_e$ and a perfluoroalkyl group. $R_d$, $R_e$, and $R_f$ are each independently selected from the group consisting of a hydrogen atom, a substituted or unsubstituted alkyl group, a substituted or unsubstituted allyl group, a substituted or unsubstituted alkene or alkenyl group, a substituted or unsubstituted aryl group, and a substituted or unsubstituted aralkyl group. As mentioned above, some examples of suitable alkyl groups include methyl, ethyl, propyl, isopropyl, butyl, isobutyl, pentyl, hexyl, etc.; an example of a suitable alkene group is an ethylene group; and some examples of suitable aryl groups include phenyl, phenylmethyl, etc. In formula (V), X is O, S, or NH, Y is a bond, $(CH_2)_q$, or $O(CH_2)_q$, where q is any integer from 1 to 100, the first polyether chain has m number of repeating monomer units, where m ranges from 1 to 200, the second polyether chain has n number of repeating monomer units, where n ranges from 1 to 200, and the third polyether chain has p number of repeating monomer units, where p ranges from 1 to 200.

In yet another example, the polymeric sensitizer includes first, second, and third functionalized anthrone moieties. Additionally, in this example, the first, second, and third functionalized anthrone moieties are each individually and respectively attached to first, second, and third amide or ether linkages. The first, second, and third amide or ether linkages are attached to first, second, and third polyether chains, respectively. In an example, the first amide or ether linkage attaches one end of the first polyether chain to the first functionalized anthrone moiety. The opposed end of the first polyether chain is attached to each of the second and third polyether chains through carbon atom(s).

Two examples of the polymeric sensitizer having three functionalized anthrone moieties respectively have the formulas (VI, with three ether linkages) and (VII, with three amide linkages):

substituted or unsubstituted aralkyl group. As mentioned above, some examples of suitable alkyl groups include methyl, ethyl, propyl, isopropyl, butyl, isobutyl, pentyl, hexyl, etc.; one example of a suitable alkene group is an ethylene group; and some examples of suitable aryl groups include phenyl, phenylmethyl, etc. In each of formulas (VI) and (VII), each of the polyether chains has n number of repeating monomer units, where n ranges from 1 to 200, and

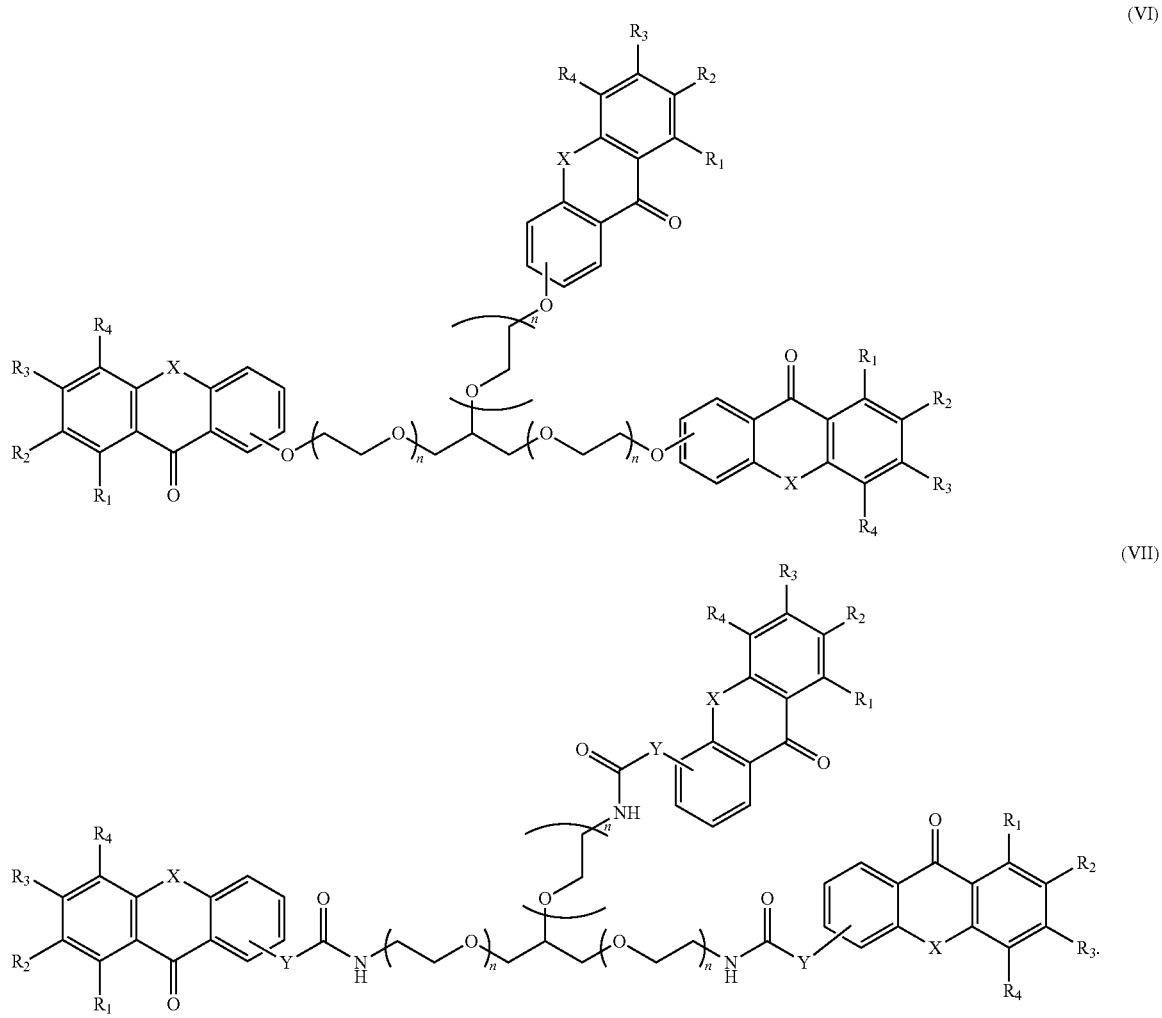

In formulas (VI) and (VII), $R_1$, $R_2$, $R_3$ and $R_4$ are each independently selected from the group consisting of a hydrogen atom, a substituted or unsubstituted alkyl group, a substituted or unsubstituted allyl group, a substituted or unsubstituted alkene or alkenyl group, a substituted or unsubstituted aryl group, a substituted or unsubstituted aralkyl group, a halogen atom, —$NO_2$, —O—$R_d$, —CO—$R_d$, —CO—O—$R_d$, —O—CO—$R_d$, —CO—$NR_dR_e$, —$NR_dR_e$, —$NR_d$—CO—$R_e$, —$NR_d$—CO—O—$R_e$, —$NR_d$—CO—$NR_eR_f$, —$SR_d$, —SO—$R_d$, —$SO_2$—$R_d$, —$SO_2$—O—$R_d$, —$SO_2NR_dR_e$ and a perfluoroalkyl group. $R_d$, $R_e$, and $R_f$ are each independently selected from the group consisting of a hydrogen atom, a substituted or unsubstituted alkyl group, a substituted or unsubstituted allyl group, a substituted or unsubstituted alkene or alkenyl group, a substituted or unsubstituted aryl group, and a X is O, S, or NH. In formula (VII), Y is a bond, $(CH_2)_q$, or $O(CH_2)_q$, where q is any integer from 1 to 100.

Still further, in another example, the polymeric sensitizer includes first, second, third, and fourth functionalized anthrone moieties. In this example, the first, second, third, and fourth functionalized anthrone moieties are each individually and respectively attached to first, second, third, and fourth amide or ether linkages. The first, second, third, and fourth amide or ether linkages are attached to first, second, third, and fourth polyether chains, respectively. In an example, the first amide or ether linkage attaches one end of the first polyether chain to the first functionalized anthrone moiety. The opposed end of the first polyether chain is attached to each of the second, third, and fourth polyether chains through carbon atom(s).

Two examples of the polymeric sensitizer having four functionalized anthrone moieties respectively have the formulas (VIII, with four ether linkages) and (IX, with four amide linkages):

In each of formulas II through XI, it is noted that the polyether chain(s) may be connected to different positions of the one benzene ring of the functionalized anthrone moiety or moieties.

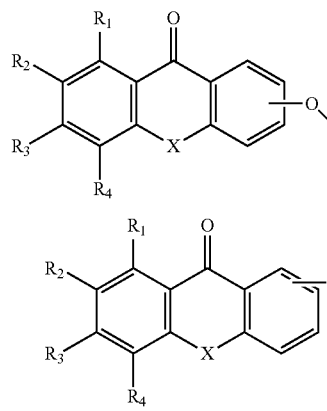
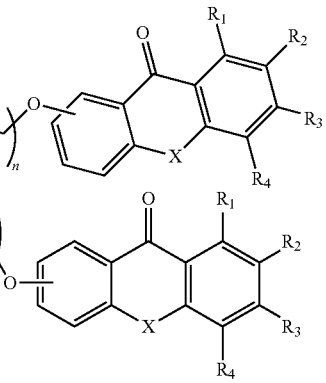

(VIII)

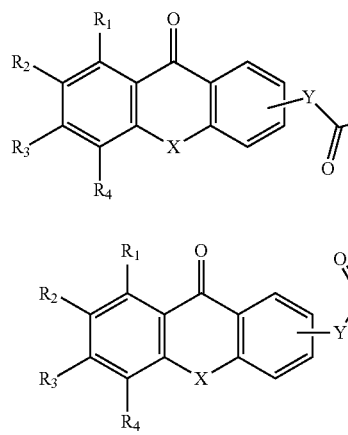
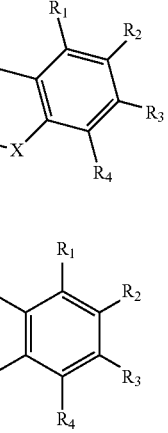

(IX)

In formulas (VIII) and (IX), $R_1$, $R_2$, $R_3$ and $R_4$ are each independently selected from the group consisting of a hydrogen atom, a substituted or unsubstituted alkyl group, a substituted or unsubstituted allyl group, a substituted or unsubstituted alkene or alkenyl group, a substituted or unsubstituted aryl group, a substituted or unsubstituted aralkyl group, a halogen atom, —$NO_2$, —O—$R_d$, —CO—$R_d$, —CO—O—$R_d$, —O—CO—$R_d$, —CO—$NR_dR_e$, —$NR_dR_e$, —$NR_d$—CO—$R_e$, —$NR_d$—CO—O—$R_e$, —$NR_d$—CO—$NR_eR_f$, —$SR_d$, —SO—$R_d$, —$SO_2$—$R_d$, —$SO_2$—O—$R_d$, —$SO_2NR_dR_e$ and a perfluoroalkyl group. $R_d$, $R_e$, and $R_f$ are each independently selected from the group consisting of a hydrogen atom, a substituted or unsubstituted alkyl group, a substituted or unsubstituted allyl group, a substituted or unsubstituted alkene or alkenyl group, a substituted or unsubstituted aryl group, and a substituted or unsubstituted aralkyl group. As mentioned above, some examples of suitable alkyl groups include methyl, ethyl, propyl, isopropyl, butyl, isobutyl, pentyl, hexyl, etc.; one example of a suitable alkene group is an ethylene group; and some examples of suitable aryl groups include phenyl, phenylmethyl, etc. In each of formulas (VIII) and (IX), each of the polyether chains has n number of repeating monomer units, where n ranges from 1 to 200, and X is O, S, or NH. In formula (IX), Y is a bond, $(CH_2)_q$, or $O(CH_2)_q$, where q is any integer from 1 to 100.

The molecular weight of the polymeric sensitizer can affect its degree of migration in cured ink. For example, a polymeric sensitizer with a weight average molecular weight ($M_W$) of about 500 or more can have reduced migration in cured ink compared with a small molecule synergist (e.g., such as methyldiethanolamine, trimethylamine, and its analogs). Migration can be further reduced by increasing the $M_W$ of the polymeric sensitizer to about 1000 or more. In one example, the polymeric sensitizer can have a $M_W$ ranging from about 500 to about 5000. Polyether chains (e.g., polyethylene glycols or methyl substituted polyethylene glycols) of various molecular weights are available, allowing for the production of polymeric sensitizers with various molecular weights. In some examples, the polyethylene glycol chain can be selected from PEG 300, PEG 550, PEG 600, PEG 750, PEG 1000, and PEG 2000.

The molecular weight of the polymeric sensitizer can also be changed (in some instances minimally) by changing or adding R groups to the functionalized anthrone moiety.

The molecular weight of the polymeric sensitizer can also affect the synergist's solubility in water. As previously described, the molecular weight of the polymeric sensitizer may be affected by the polyether chain(s). Although the functionalized anthrone moiety(ies) alone can be insoluble in water, adding the water soluble polyether chain(s) can make the entire polymeric sensitizer water soluble. As the polyether chain increases, the molecular weight increases, and the water solubility increases. In such cases, the soluble polyether chain(s) can have a sufficient molecular weight so that its solubility properties overcome the insolubility of the functionalized anthrone moiety(ies). For example, when one monomer (e.g., —CH$_2$CH$_2$O—) is included in the polyethylene glycol chain (e.g., n=1 in formula (II)), the polymeric sensitizer is minimally water soluble, and as the number of monomers increases, the water solubility of the polymeric sensitizer increases. In addition, water soluble R groups can be included or added to the functionalized anthrone moiety(ies) to increase the solubility of the polymeric sensitizer. In one example, the polymeric sensitizer can have a water solubility of at least 0.1 wt %. When the water solubility is at least 0.1 wt %, it means that of the total wt % of the polymeric sensitizer added to water, at least 0.1 wt % of the total is water soluble. In some instances, the polymeric sensitizer may have a water solubility ranging from 0.1 wt % to 20 wt %. It is believed that higher water solubility, potentially up to 100 wt %, may also be achieved.

The water soluble polymeric sensitizer is present in the photo curable ink composition in an amount ranging from about 0.1 wt % to about 10 wt % based on a total wt % of the photo curable ink composition.

As mentioned above, the photo curable ink composition also includes a photo-reactive binder. The photo-reactive binder may be any ultraviolet (UV) polymerizable compound having a polymerizable group that is radically polymerized by UV rays. The polymerizable group may be include an ethylenically unsaturated double bond, specific examples of which may include an acryloyl group, a methacryloyl group, a vinyl group, a vinyl ether group, a maleic anhydride group, and a substituted maleimide group.

The ultraviolet polymerizable compound may be a monomer, an oligomer, or a mixture thereof. The ultraviolet polymerizable compound may be a water-soluble ultraviolet polymerizable compound or a water-insoluble ultraviolet polymerizable compound. For the ultraviolet polymerizable compound, "water-soluble" means that the compound is dissolved in an amount of 1 part by mass or more (e.g., 10 parts by mass or more) based on 100 parts by mass of water at 25° C. For the ultraviolet polymerizable compound, "water insoluble" means that the compound is dissolved in an amount of less than 1 part by mass based on 100 parts by mass of water at 25° C.

Some examples of the water-soluble ultraviolet polymerizable compound include radical polymerizable monomers, such as acryloyl morpholine (ACMO), hydroxyethyl acrylamide (HEAA), diacetone acrylamide, N-vinyl-2-pyrrolidone, N-vinyl-formamide, vinyl naphthalene sulfonic acid, hydroxyethyl(meth)acrylate, methoxypolyethylene glycolmethacrylate, methoxy polyethylene glycolacrylate, an ester of succinic anhydride and 2-hydroxyethyl(meth)acrylate, and an ester of orthophthalic anhydride and 2-hydroxyethyl(meth)acrylate. Other examples of the water-soluble ultraviolet polymerizable compound include radical polymerizable monomers (such as (meth)acrylate ester of polyhydric alcohol, and (meth) acrylate ester of glycidyl ether (derived from polyhydric alcohol)), or an oligomer obtained by polymerizing water soluble ultraviolet polymerizable monomers to a required degree of polymerization may also be exemplified.

In still other examples, the photo-reactive binder can include a combination of a UV or LED curable polyurethane and hydrophobic radiation-curable monomer(s). In one example, the photo-reactive binder can include a water dispersible (meth)acrylated polyurethane, such as NEORAD® R-441 by NeoResins (Avecia). Other examples of UV reactive binders can include UCECOAT® 7710, UCECOAT® 7655 (available from Allnex), NEORAD® R-440, NEORAD® R-441, NEORAD® R-447, NEORAD® R-448 (available from DSM NeoResins), BAYHYDROL® UV 2317, BAYHYDROL® UV VP LS 2348 (available from Bayer), Lux 260, Lux 430, Lux 399, Lux 484 (available from Alberdingk Boley), LAROMER® LR 8949, LAROMER® LR 8983, LAROMER® PE 22WN, LAROMER® PE 55WN, or LAROMER® UA 9060 (available from BASF), and experimental UV curable polyurethane dispersions from the suppliers.

Any of the photo-reactive binders may be used either alone or in combination of two or more kinds thereof. The photo-reactive binder is present in the photo curable ink composition in an amount ranging from about 5 wt % to about 70 wt %, based on the wt % of the ink composition. In other example, the amount of the photo-reactive binder ranges from about 10 wt % to about 60 wt %, or from about 15 wt % to about 50 wt %, based on the wt % of the ink composition.

As mentioned above, the photo curable ink composition also includes a colorant. The colorant in the photo curable ink composition may be a pigment or a dye. In some examples, the colorant can be present in an amount from about 0.5 wt % to about 15 wt % based on a total wt % of the photo curable ink composition. In one example, the colorant can be present in an amount from about 1 wt % to about 10 wt %. In another example, the colorant can be present in an amount from about 5 wt % to about 10 wt %.

The volume average particle size of the colorant may range from 10 nm to 1,000 nm. The volume average particle size of the colorant refers to a particle size of a colorant itself, or a particle size of a colorant with an additive, such as a dispersant, adhered to the colorant.

Example colors of the colorant are black, cyan, magenta, yellow, red, green, blue, brown, white, or metallic lusters (such as gold and silver). The colorants may also be colorless of lightly-colored.

The colorant may be a particle obtained by fixing a dye or a pigment onto the surface of silica, alumina, or polymer beads as a core, an insoluble lake product of a dye, a colored emulsion, and a colored latex.

In some examples, the colorant may be a dye. As used herein, "dye" refers to compounds or molecules that absorb electromagnetic radiation or certain wavelengths thereof. Dyes can impart a visible color to the ink composition if the dyes absorb wavelengths in the visible spectrum. The dye can be nonionic, cationic, anionic, or a mixture of nonionic, cationic, and/or anionic dyes. The dye can be a hydrophilic anionic dye, a direct dye, a reactive dye, a polymer dye or an oil soluble dye. Specific examples of dyes that may be used include Sulforhodamine B, Acid Blue 113, Acid Blue 29, Acid Red 4, Rose Bengal, Acid Yellow 17, Acid Yellow 29, Acid Yellow 42, Acridine Yellow G, Acid Yellow 23, Acid Blue 9, Nitro Blue Tetrazolium Chloride Monohydrate or Nitro BT, Rhodamine 6G, Rhodamine 123, Rhodamine B, Rhodamine B Isocyanate, Safranine O, Azure B, and Azure B Eosinate, which are available from Sigma-Aldrich Chemical Company (St. Louis, Mo.). Examples of anionic, water-soluble dyes include Direct Yellow 132, Direct Blue 199, Magenta 377 (available from Ilford AG, Switzerland), alone or together with Acid Red 52. Examples of water-insoluble dyes include azo, xanthene, methine, polymethine, and anthraquinone dyes. Specific examples of water-insoluble dyes include ORASOL® Blue GN, ORASOL® Pink, and ORASOL® Yellow dyes available from BASF Corp. Black dyes may include Direct Black 154, Direct Black 168, Fast Black 2, Direct Black 171, Direct Black 19, Acid Black 1, Acid Black 191, Mobay Black SP, and Acid Black 2.

In other examples, the colorant may be a pigment. As used herein, "pigment" generally includes organic or inorganic pigment colorants, magnetic particles, aluminas, silicas, and/or other ceramics, organo-metallics or other opaque particles, whether or not such particulates impart color. Thus, although the present description primarily illustrates the use of pigment colorants, the term "pigment" can be used more generally to describe pigment colorants, as well as other pigments such as organometallics, ferrites, ceramics, etc.

Suitable pigments include the following, which are available from BASF Corp.: PALIOGEN® Orange, HELIOGEN® Blue L 6901F, HELIOGEN® Blue NBD 7010, HELIOGEN® Blue K 7090, HELIOGEN® Blue L 7101F, PALIOGEN® Blue L 6470, HELIOGEN® Green K 8683, HELIOGEN® Green L 9140, CHROMOPHTAL® Yellow 3G, CHROMOPHTAL® Yellow GR, CHROMOPHTAL® Yellow 8G, IGRAZIN® Yellow 5GT, and IGRALITE® Rubine 4BL. The following pigments are available from Degussa Corp.: Color Black FWI, Color Black FW2, Color Black FW2V, Color Black 18, Color Black, FW200, Color Black 5150, Color Black S160, and Color Black 5170. The following black pigments are available from Cabot Corp.: REGAL® 400R, REGAL® 330R, REGAL® 660R, MOGUL® L, BLACK PEARLS® L, MONARCH® 1400, MONARCH® 1300, MONARCH® 1100, MONARCH® 1000, MONARCH® 900, MONARCH® 880, MONARCH® 800, and MONARCH® 700. The following pigments are available from Orion Engineered Carbons GMBH: PRINTEX® U, PRINTEX® V, PRINTEX® 140U, PRINTEX® 140V, PRINTEX® 35, Color Black FW 200, Color Black FW 2, Color Black FW 2V, Color Black FW 1, Color Black FW 18, Color Black S 160, Color Black S 170, Special Black 6, Special Black 5, Special Black 4A, and Special Black 4. The following pigment is available from DuPont: TI-PURE® R-101. The following pigments are available from Heubach: MONASTRAL® Magenta, MONASTRAL® Scarlet, MONASTRAL® Violet R, MONASTRAL® Red B, and MONASTRAL® Violet Maroon B. The following pigments are available from Clariant: DALAMAR® Yellow YT-858-D, Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, NOVOPERM® Yellow HR, NOVOPERM® Yellow FGL, Hansa Brilliant Yellow 10GX, Permanent Yellow G3R-01, HOSTAPERM® Yellow H4G, HOSTAPERM® Yellow H3G, HOSTAPERM® Orange GR, HOSTAPERM® Scarlet GO, and Permanent Rubine F6B. The following pigments are available from Sun Chemical: QUINDO® Magenta, INDOFAST® Brilliant Scarlet, QUINDO® Red R6700, QUINDO® Red R6713, INDOFAST® Violet, L74-1357 Yellow, L75-1331 Yellow, L75-2577 Yellow, and LHD9303 Black. The following pigments are available from Birla Carbon: RAVEN® 7000, RAVEN® 5750, RAVEN® 5250, RAVEN® 5000 Ultra® II, RAVEN® 2000, RAVEN® 1500, RAVEN® 1250, RAVEN® 1200, RAVEN® 1190 Ultra®. RAVEN® 1170, RAVEN® 1255, RAVEN® 1080, and RAVEN® 1060. The following pigments are available from Mitsubishi Chemical Corp.: No. 25, No. 33, No. 40, No. 47, No. 52, No. 900, No. 2300, MCF-88, MA600, MA7, MA8, and MA100. The colorant may be a white pigment, such as titanium dioxide, or other inorganic pigments such as zinc oxide and iron oxide.

Specific examples of a cyan color pigment may include C.I. Pigment Blue-1, -2, -3, -15, -15:1, -15:2, -15:3, -15:4, -16, -22, and -60. Specific examples of a magenta color pigment may include C.I. Pigment Red-5, -7, -12, -48, -48:1, -57, -112, -122, -123,-146, -168, -177, -184, -202, and C.I. Pigment Violet-19. Specific examples of a yellow pigment may include C.I. Pigment Yellow-1, -2, -3, -12, -13, -14, -16, -17, -73, -74, -75, -83, -93, -95, -97, -98, -114, -128, -129, -138, -151, -154, and -180. While several examples have been given herein, it is to be understood that any other pigment or dye can be used that is useful in modifying the color of the UV curable ink.

The pigment can be self-dispersed with a polymer, an oligomer, or a small molecule. The self-dispersed pigment refers to a pigment having water-solubilizing groups on the pigment surface, which can be dispersed in water even without a separate dispersant. The self-dispersed pigment may be obtained by carrying out surface modification treatments, such as an acid/base treatment, a coupling agent treatment, a polymer graft treatment, a plasma treatment, or an oxidation/reduction treatment, on a pigment. Examples of the self-dispersed pigment may include, in addition to the above described surface modified pigment, commercially available self-dispersed pigments, such as CAB-O-JET®-200, CAB-O-JET®-300, CAB-O-JET®-400, IJX-™ 157, IJX-™ 253, IJX-™ 266, IJX-™ 273, IJX-TM444, IJX-™ 55, CAB-O-JET®-250C, CAB-O-JET®-260M, CAB-O-JET®-270, CAB-O-JET®-4500, CAB-O-JET®-465M, CAB-O-JET®-470Y, and CAB-O-JET®-480V available from Cabot Corporation.

Some examples of the self-dispersed pigment have a sulfonic acid, sulfonate, carboxylic acid, or carboxylate as a functional group on the surface thereof. An example of the pigment at least having carboxylic acid or carboxylate as a functional group on the surface thereof is a pigment coated with a resin. This type of pigment may be referred to as a microcapsule pigment. Commercially available microcapsule pigments are available from DIC Corporation, or TOYO Ink Co., Ltd. The self-dispersed pigment may also have a polymer compound physically adsorbed or chemically bonded to the pigment.

The pigment can be dispersed with a separate dispersant. Examples of the pigment dispersant that may be used may include a polymer dispersant, an anionic surfactant, a cationic surfactant, an amphoteric surfactant, and a nonionic surfactant.

As the polymer dispersant, a polymer having a hydrophilic structure and a hydrophobic structure may be used. As the polymer having the hydrophilic structure and the hydrophobic structure, a condensation polymer or an addition polymer may be used. Examples of the condensation polymer may include a polyester based dispersant. Examples of the addition polymer may include an addition polymer of monomers having an ethylenically unsaturated group. By copolymerizing a monomer having an ethylenically unsaturated group having a hydrophilic group and a monomer having an ethylenically unsaturated group having a hydrophobic group, a suitable polymer dispersant may be obtained. Further, a homopolymer of monomers having an ethylenically unsaturated group having a hydrophilic group may be used. Examples of the monomer having an ethylenically unsaturated group having a hydrophilic group may include monomers having a carboxyl group, a sulfonate group, a hydroxyl group, a phosphate group, or the like. Some specific examples include acrylic acid, methacrylic acid, crotonic acid, itaconic acid, itaconic acid monoester, maleic acid, maleic acid monoester, fumaric acid, fumaric acid monoester, vinyl sulfonic acid, styrene sulfonic acid, sulfonated vinyl naphthalene, vinyl alcohol, acrylamide, methacryloxy ethyl phosphate, bismethacryloxy ethyl phosphate, methacryloxy ethyl phenyl acid phosphate, ethylene glycol dimethacrylate, and diethylene glycol dimethacrylate.

Examples of suitable dispersants/surfactants include alkyl polyethylene oxides, alkyl phenyl polyethylene oxides, polyethylene oxide block copolymers, acetylenic polyethylene oxides, polyethylene oxide (di)esters, protonated polyethylene oxide amines, protonated polyethylene oxide amides, dimethicone copolyols, substituted amine oxides, and the like. Suitable surfactants can include nonionic secondary alcohol ethoxylates, such as TERGITOL™ 15-S-12 and TERGITOL™ 15-S-7 (available from Dow Chemical Company); nonionic, octylphenol ethoxylate surfactants, such as TRITON™ X-100 or TRITON™ X-405 (available from Dow Chemical Company); and sodium dodecylsulfate.

Some examples of the anionic surfactant may include alkylbenzene sulfonate, alkylphenyl sulfonate, alkylnaphthalene sulfonate, a higher fatty acid salt, a sulfate ester salt of higher fatty acid ester, a sulfonate of higher fatty acid ester, a sulfate ester salt and sulfonate of higher alcohol ether, higher alkyl sulfosuccinate, polyoxyethylene alkylether carboxylate, polyoxyethylene alkylether sulfate, alkyl phosphate, and polyoxyethylene alkyl ether phosphate. Some specific examples of the anionic surfactant include dodecylbenzenesulfonate, isopropylnaphthalenesulfonate, monobutylphenylphenol monosulfonate, monobutylbiphenyl sulfonate, and dibutylphenylphenol disulfonate.

Some examples of the nonionic surfactant may include polyoxyethylene alkyl ether, polyoxyethylene alkyl phenyl ether, polyoxyethylene fatty acid ester, sorbitan fatty acid ester, polyoxyethylene sorbitan fatty acid ester, polyoxyethylene sorbitol fatty acid ester, glycerin fatty acid ester, polyoxyethylene glycerin fatty acid ester, polyglycerin fatty acid ester, sucrose fatty acid ester, polyoxyethylene alkylamine, polyoxyethylene fatty acid amide, alkyl alkanolamide, fatty acid alkyloamide, polyethylene glycol polypropylene glycol block copolymer, acetylene glycol, and a polyoxyethylene adduct of acetylene glycol. Some specific examples of the nonionic surfactant include polyoxyethylenenonyl phenylether, polyoxyethyleneoctyl phenylether, and polyoxyethylenedodecyl phenylether. Further examples of the nonionic surfactant may include silicon surfactants, such as a polysiloxane oxyethylene adduct; fluorine surfactants, such as perfluoroalkylcarboxylate, perfluoroalkyl sulfonate, and oxyethyleneperfluoro alkylether; and biosurfactants, such as spiculisporic acid, rhamnolipid, and lysolecithin.

The polymer dispersant or the nonionic, cationic, anionic and/or amphoteric surfactants can be present in an amount ranging from about 0.01 wt % to 10 wt % based on a total wt % of the photo curable ink composition.

Still other suitable colorants include wax resin powders or emulsions colored by a dye, a fluorescent dye, or a fluorescent pigment.

The balance of the photo curable ink composition is water (e.g., purified water, deionized water, etc.). As such, the wt % of the water depends on the other components in the ink composition.

Some examples of the photo curable ink composition disclosed herein include a co-solvent in addition to water. Classes of co-solvents that may be used can include organic co-solvents, including alcohols (e.g., aliphatic alcohols, aromatic alcohols, polyhydric alcohols (e.g., diols), polyhydric alcohol derivatives, long chain alcohols, etc.), glycol ethers, polyglycol ethers, a nitrogen-containing solvent (e.g., pyrrolidinones, caprolactams, formamides, acetamides, etc.), and a sulfur-containing solvent. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs (C6-C12) of polyethylene glycol alkyl ethers, N-alkyl caprolactams, unsubstituted caprolactams, both substituted and unsubstituted formamides, both substituted and unsubstituted acetamides, and the like. Still other examples of suitable co-solvents include propylene carbonate and ethylene carbonate.

Some examples of the polyhydric alcohols may include sugar alcohols such as ethylene glycol, diethylene glycol, propylene glycol, butylene glycol, triethylene glycol, tetraethylene glycol, 2-methyl-1,3-propanediol, 1,5-pentanediol, 1,2-hexanediol, 1,5-hexanediol, 1,6-hexanediol, 1,2,6-hexanetriol, glycerin, trimethylolpropane, and xylitol; and saccharides such as xylose, glucose, and galactose. Some examples of the polyhydric alcohol derivatives may include ethylene glycol monomethyl ether, ethylene glycol mono ethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, and ethylene oxide adduct of diglycerin. Some examples of the nitrogen-containing solvent may include 2-pyrrolidinone, N-methyl-2-pyrrolidone, 1-(2-hydroxyethyl)-2-pyrrolidone, cyclohexylpyrrolidone, and triethanolamine. Examples of the alcohols may include ethanol, isopropyl alcohol, butyl alcohol, and benzyl alcohol. Examples of the sulfur-containing solvent may include thiodiethanol, thiodiglycerol, sulfolane, and dimethyl sulfoxide.

A single co-solvent may be used, or several co-solvents may be used in combination. When included, the co-solvent(s) is/are present in total in an amount ranging from 0.1 wt % to 60 wt %, depending on the jetting architecture, though amounts outside of this range can also be used. As other example, the co-solvent(s) may range from about 1 wt % to about 30 wt % or about 40 wt % of the total wt % of the photo curable ink composition.

The photo curable ink composition may also include various other additives to enhance the properties of the ink composition for specific applications. Examples of these additives include those added to inhibit the growth of microorganisms, viscosity modifiers, materials for pH adjustment, sequestering agents, anti-kogation agents, preservatives, and the like.

The additives added to inhibit the growth of microorganisms may be biocides, fungicides, and other microbial agents. Examples of suitable microbial agents include, but are not limited to, NUOSEPT® (Nudex, Inc.), UCARCIDE™ (Union carbide Corp.), VANCIDE® (R.T. Vanderbilt Co.), PROXEL® (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0 wt % to about 2 wt % (of the total wt % of the ink composition) of the sequestering agent and/or the buffer solution, for example, can be used. Viscosity modifiers may also be present, as well as other additives to modify properties of the ink as desired. Such additives can be present in an amount ranging from 0 wt % to about 20 wt % based on the total wt % of the ink composition.

Both the polymeric sensitizer and the photoinitiator disclosed herein can be stable in basic aqueous environments at pH from greater than 7 to 14 or higher. Thus, the photo curable ink composition can be formulated to have a pH from greater than 7 to 14 or higher. In some examples, the photo curable ink can have a pH of 8 or higher. In one specific example, the photo curable ink can have a pH of 8.5. As used herein, the term "stable" refers to the ability of the polymeric sensitizer and the photoinitiator to have a shelf life of at least 1 year. As examples, the photo curable ink compositions disclosed herein can have a shelf life of greater than 1 year, greater than 2 years, or longer.

As mentioned herein, both the polymeric sensitizer and the photoinitiator can exhibit less migration in the cured ink compared with other sensitizers or photoinitiators, such as small molecule synergists. The photo-reactive binder in the ink composition can include polymers or monomers that polymerize or cross-link during the curing process. As the binder cures, the polymeric sensitizer can become locked into the cured binder due, in part, to the polyether chain of the polymeric sensitizer. The photoinitiator may become fully polymerized to form a polymer network with the cured binder. Therefore, there is little or no migration of the polymeric sensitizer and the photoinitiator in the cured ink composition.

The present disclosure also extends to a method of making the photo curable ink composition. In an example, a method can include mixing the reactive binder, the polymeric sensitizer, the photoinitiator, the colorant, and water (alone or in combination with co-solvent(s)). In one example, the method can also include adjusting the pH of the ink composition to be from greater than 7 to 14. In another example, the method can include adjusting the pH of the ink to be 8 or higher.

The photo curable ink composition can be printed on a broad selection of substrates, including untreated plastics, flexible as well as rigid, porous or non-porous substrates. Some examples include paper (e.g., plain paper, coated, glossy paper, etc.), cardboard, foam board, textile, and others. The ink composition exhibits good adhesion on a variety of substrates. The photo curable ink composition also has viscosity suitable for inkjet printing, thus enabling good printing performance. In some examples, the ink composition can be formulated for thermal inkjet printing. The photo-curable ink composition of the present disclosure enables high printing speed and is very well suited for use in digital inkjet printing.

The photo curable ink composition can be UV curable, and in one specific example, may be UV LED curable. As used herein, "UV curable" refers to compositions that can be cured by exposure to ultraviolet light from any UV source such as a mercury vapor lamp, UV LED source, or the like. Mercury vapor lamps emit high intensity light at wavelengths from 240 nm to 270 nm and 350 nm to 380 nm. "LED curable" refers to compositions that can be cured by ultraviolet light from an ultraviolet LED. Ultraviolet LEDs typically emit light at specific wavelengths. For example, ultraviolet LEDs are available at 365 nm and 395 nm wavelengths, among others. The term "photo curable" refers generally to compositions that can be cured by exposure to light from any wavelength suitable for the composition being cured. Typically, the photo curable composition will be UV curable, and in some cases UV LED curable.

To further illustrate the present disclosure, examples are given herein. It is to be understood that these examples are provided for illustrative purposes and are not to be construed as limiting the scope of the present disclosure.

EXAMPLES

Example 1

A sodium TPO salt (TPO-Na) was made. 128.8 grams (0.42 mol) of ethyl trimethylbenzoylphenylphosphinate were initially introduced into 600 ml of ethyl methyl knetone (MEK). Then, 1.1 equivalents of 69 grams (0.46 mol) of sodium iodide were added to the solution. After 15 minutes, the homogeneous solution was heated to 65° C. and stirred for 24 hours. A white solid formed in the solution. After cooling down to room temperature, the white solid was collected by vacuum filtration, and was washed with petroleum ether (500 ml, three times each) by stirring inside a beaker. The white solid was further dried in oven. The yield was 112.7 g (90%) of the TPO-Na.

The TPO-Na was dissolved in a solution of 10% 1-(2-hydroxyethyl)-2-pyrrolidone (2HE2P) and water. The absorbance of the solution was taken immediately after formation, after 2 weeks in an accelerated storage environment, and after 4 weeks in the accelerated storage environment. The absorbance after exposure to the accelerated storage environment is indicative of the accelerated storage (or shelf) life (ASL) of the solution. The absorbance was measured with a UV-Vis spectrophotometer. The accelerated storage environment may be an environment that has a temperature ranging from about 45° C. to about 60° C. In this example, the accelerated storage environment is an oven baked at a temperature of about 50° C., and the TPO-Na solution was stored in the accelerated storage environment for the selected time periods. The ASL results are shown in FIG. 1. Compared to the initial absorption (labeled TPO-Na/10%2HE2P), TPO-Na does not show any degradation after 2 weeks or 4 weeks of accelerated storage, which means TPO-Na is stable at this condition.

Figure 2:
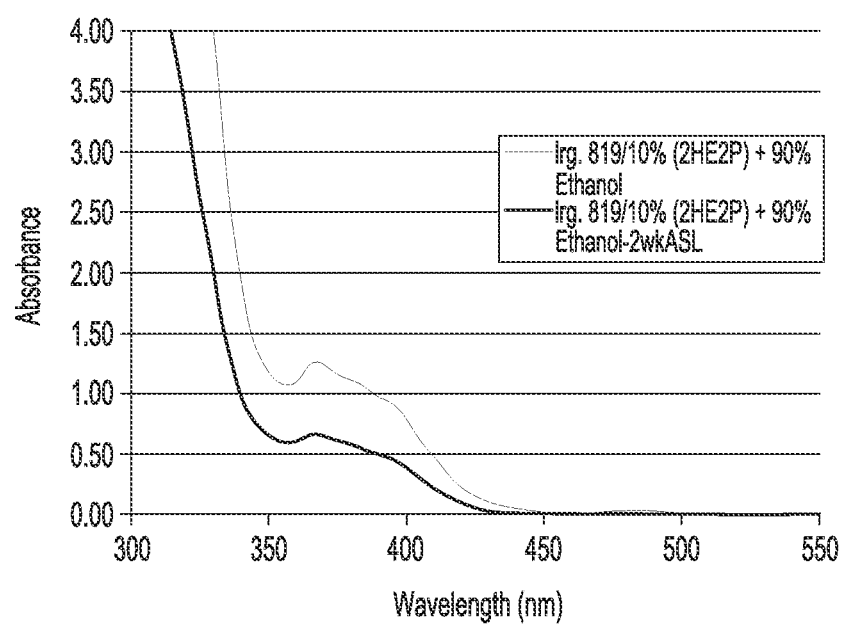
FIG. 2 is a graph illustrating the stability of a comparative photoinitiator.

As a comparative example, IRGACURE® 819 (BASF Corp.) was dissolved in a solution of 10% 1-(2-hydroxyethyl)-2-pyrrolidone (2HE2P) and 90% ethanol. The solvent mixture was selected because IRGACURE® 819 is not water soluble. The absorbance of the solution was taken immediately after formation and after 2 weeks in the same accelerated storage environment as the TPO-Na solution. In the presence of the solvent mixture, the IRGACURE® 819 likely goes through solvolysis, losing its reactivity after a few months (evidenced by the accelerated storage results). The results are shown in FIG. 2. Comparing the results for the TPO-Na solution with the results for the IRGACURE® 819 solution, IRGACURE® 819 showed almost 50% loss of absorption after 2 week of accelerated storage. These results demonstrate significant stability improvement of TPO-Na over IRGACURE® 819.

Example 2

A water soluble polymeric sensitizer having formula (II):

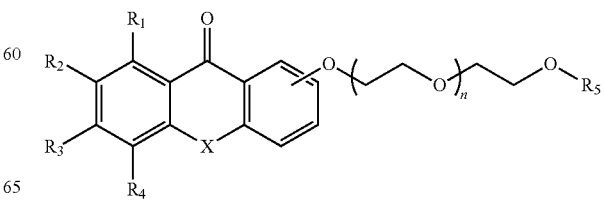

was prepared, where the functionalized anthrone moiety was thioxanthrenone, n was about 13, and $R_5$ was a methyl group. This is referred to as TX-PEG-600.

0.5 wt % of the TPO-Na photoinitiator of Example 1 was dissolved in water. 0.25 wt % of the water soluble polymeric sensitizer was dissolved in water. The UV-Visible absorption of the TPO-Na salt (labeled TPO-Nax100) and the water soluble polymeric sensitizer (labeled TXPEG600×100) was measured. The absorbance results (multiplied by 100) are shown in FIG. 3 along the left Y axis, along with the LED output along the right Y axis.

Figure 3:
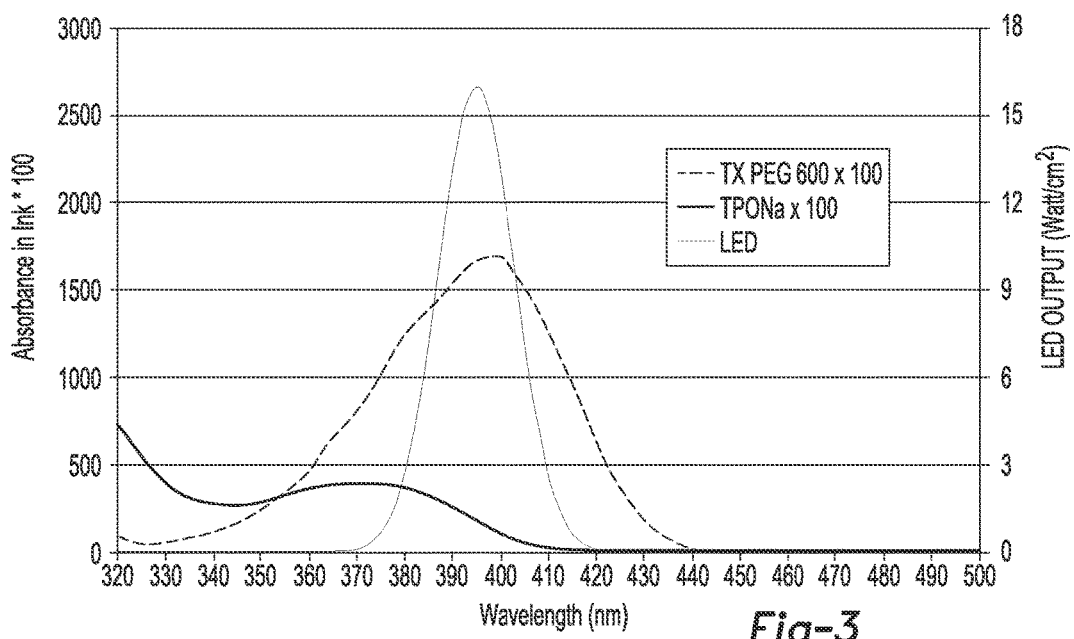
FIG. 3 is a graph illustrating the UV-Visible Absorption of a trimethylbenzoylphenylphosphinic acid sodium salt (TPO-Na) photoinitiator and an example of the water soluble polymeric sensitizer disclosed herein.

As shown in FIG. 3, the TPO-Na has an absorption λmax at 372 nm, its tail extends to 410 nm, and has pretty good overlap with the emission spectrum of the 395 nm LED. The molar extinct coefficient ε at 395 nm is 114, which is slightly lower than that of water insoluble analogs TPO-L (an ester starting material that can be used to make the TPO salts) and IRGACURE® 819 measured in ethanol (neither of which is shown). The TX-PEG-600 (λmax=398 nm, ε=6810) has a slight redshift in its absorption spectrum compared with isopropylthioxanthone (ITX, not shown, but which has a perfect overlap with LED emission spectrum). The results in FIG. 3 illustrate that the TPO-Na salt and the water soluble polymeric sensitizer have high reactivity at 395 nm LED lights.

Example 3

A photo-reactive binder (referred to as PUD-620) of the inks was synthesized as follows:

(Part 1) 103.4 g of bisphenol A glycerolate diacrylate (BGDA), 1.03 g of 4-methoxyphenyl (MEHQ), 142.3 g of isophorone diisocyanate (IPDI), and 164 g of acetone were mixed in a 500 ml 4-neck round bottom flask. A mechanical stirrer (with glass rod and a TEFLON® blade) and a condenser were attached. The flask was immersed in a constant temperature bath at 60° C. The reactor system was maintained under dry oxygen blanket. 12 drops of dibutyl tin dilaurate (DBTDL) were added to initiate the polymerization. Polymerization was continued for 2 hours at 60° C. until the % NCO reached the theoretical value. A 0.5 g sample was withdrawn for % NCO titration to confirm reaction.

(Part 2) 114.26 g of 3-(acryloyloxy)-2-hydroxypropyl methacrylate (AHPMA), 1.14 g of MEHQ, and 66 g of acetone were mixed in a beaker and added to the reactor system over 30 seconds. The polymerization was continued for 4 hours at 60° C. 0.5 g of prepolymer was withdrawn for final % NCO titration. The water bath temperature was reduced to 30° C.

(Part 3) 40.05 g taurine, 25.6 g of 50% NaOH, and 200.3 g of deionized water were mixed in a beaker until the taurine completely dissolved. This solution was added to the reactor system at 30° C. with vigorous stirring over 1-3 minutes. The water bath temperature was raised to 40° C. to complete the reaction. The mixture became clear and viscous after 10-15 minutes.

(Part 4) The viscous, prepolymer mixture was added to 1026.9 g of deionized over 5-10 minutes with enough agitation to form a polyurethane dispersion (PUD). The PUD was filtered through 400 mesh stainless sieve. Acetone was removed with a Rotovap at 55° C.

The average particle radius of the polyurethane in PUD-620 was measured by Malvern Zetasizer and was 14 nm (radius). The pH was 7.2. The % Solid was 32.3%.

Example 4

A set of cyan inks were prepared to illustrate the effect of the photo initiating system disclosed herein.

Table 1A lists six cyan formulations prepared with three different UV curable polyurethane dispersions. PUD-520 is an acrylated polyurethane dispersion synthesized using a similar procedure as described for PUD 620 in Example 3. For PUD-520, however, hexamethylene diisocyanate was used instead of isophorone diisocyanate during Part 1 of the PUD synthesis. IRR 782 is an experimental UV curable polyurethane dispersion developed for inkjet applications. UCECOAT® 7710 is a commercial product of the same family as IRR 782, and it is designed for wood coating applications. Both IRR 782 and UCECOAT® 7710 were obtained from Allnex.

As shown in Table 1A, comparative samples 4-4A, 4-5A, and 4-6A were formulated with dispersed IRGACURE® 819 and TX-PEG-1000. Also as shown in Table 1A, example samples 4-1, 4-2, and 4-3 were formulated with an example of the photo initiator system disclosed herein, i.e., TPO-Na (from Example 1) and TX-PEG-1000. TX-PEG-1000 is similar to TX-PEG-600 (from Example 2) except the polyethylene glycol 600 (n~13) is replaced with polyethylene glycol 1000 (n~22). The loading of TX-PEG-1000 and TPO-Na was the same across samples 1-3.

Table 1B list the formulation of six additional comparative examples (labeled comparative examples 4-1B, 4-2B, 4-3B, 4-4B, 4-5B, and 4-6B, respectively). The formulation for these examples was the same as listed in Table 1A, except TX-PEG-1000 was removed from all of the ink formulations.

TABLE 1A

| Component | Example 4-1 | Example 4-2 | Example 4-3 | Comp. Example 4-4A | Comp. Example 4-5A | Comp. Example 4-6A |
|---|---|---|---|---|---|---|
| PUD 520 | 15.0 | 0 | 0 | 15.0 | 0 | 0 |
| IRR 782 | 0 | 15.0 | 0 | 0 | 15.0 | 0 |
| UCECOAT ® 7710 | 0 | 0 | 15.0 | 0 | 0 | 15.0 |
| IRGACURE ® 819 | 0 | 0 | 0 | 0.3 | 0.3 | 0.3 |
| TPO-Na | 1.5 | 1.5 | 1.5 | 0 | 0 | 0 |
| TX-PEG-1000 | 0.50 | 0.50 | 0.50 | 0.50 | 0.50 | 0.50 |
| DYNAX DX 4000 (fluorosurfactant) | 0.15 | 0.15 | 0.15 | 0.15 | 0.15 | 0.15 |
| Cyan Dispersion from TOYO pigment | 2.50 | 2.50 | 2.50 | 2.50 | 2.50 | 2.50 |
| Water | | | balance to 100 gram | | | |

TABLE 1B

| Component | Comp. Example 4-1B | Comp. Example 4-2B | Comp. Example 4-3B | Comp. Example 4-4B | Comp. Example 4-5B | Comp. Example 4-6B |
|---|---|---|---|---|---|---|
| PUD 520 | 15.0 | 0 | 0 | 15.0 | 0 | 0 |
| IRR 782 | 0 | 15.0 | 0 | 0 | 15.0 | 0 |
| UCECOAT ® 7710 | 0 | 0 | 15.0 | 0 | 0 | 15.0 |
| IRGACURE ® 819 | 0 | 0 | 0 | 0.3 | 0.3 | 0.3 |
| TPO-Na | 1.5 | 1.5 | 1.5 | 0 | 0 | 0 |
| TX-PEG-1000 | 0 | 0 | 0 | 0 | 0 | 0 |
| DYNAX DX 4000 (fluorosurfactant) | 0.15 | 0.15 | 0.15 | 0.15 | 0.15 | 0.15 |
| Cyan Dispersion from TOYO pigment | 2.50 | 2.50 | 2.50 | 2.50 | 2.50 | 2.50 |
| Water | balance to 100 gram | | | | | |

The inks were made based on the following procedure.

(Part 1) Making PUD and PI (photoinitiator) mix. Take the certain amount of PUD required by Table 1A, and adjust the pH to pH=7.5 or above. The required amount (according to Table 1A) of IRGACURE® 819 or TPO-Na, sensitizer (i.e., TX-PEG-1000), and fluorosurfactant DYNAX DX-4000 were added, and the mixtures were mixed thoroughly. In the cases of the formulations containing IRGACURE® 819, the mixture was heated to 50° C. for 30 minutes in a water bath until all the IRGACURE® 819 was dissolved into the PUD. A light greenish yellow color developed once fully dissolved. In the cases of the comparative samples shown in Table 1B, no TX-PEG-1000 was added.

(Part 2) The required amount of pigment dispersion (cyan dispersion from TOYO pigment dispersed with an internal ink formulation), as shown in Tables 1A and 1B was added to another beaker, and under constant agitation, the PUD/PI/Vehicle mixture was added to the pigment dispersion. The inks were titrated to pH=8.5 and diluted to the required volume.

To speed up the printing process, the ink was coated on coated offset paper (Sterling Ultra Gloss (SUG)) with #5 wire bar to obtain 10 gsm wet laydown. This is the same amount of ink that is printed with a 6 ng pen and 3 drops per pixel at 1/300th of an inch pixel size. The ink was dried using a hot gun for 2 minutes before going to the curing process.

Some of the dried samples and comparative samples were cured on a conveyor at 100 feet/minute, using 16 watts/cm² LED lamp, with maximum emission at 395 nm wavelength. For the uncured samples and comparative samples, the inks were also coated and dried in the same way as the cured sample, except the last curing step was omitted.

The curing effect of the samples and comparative samples were evaluated using a Taber Linear Abrasion wet rub tester (model 5750). The tip of the rod was wrapped with a piece of white cloth, and 150 microliters of water was applied on the cloth before the test. The tip was rubbed on the ink film samples and comparative samples for 5 rub cycles at 42 cycles per minute.

The damage to the ink film samples and comparative samples were ranked in the following two ways: (1) visual grade, if the ink is totally removed, the wet rub resistance is ranked as 5, and if no ink is removed at all, the wet rub resistance is ranked as zero (0). In this ranking test, the smaller the value the better. (2) The optical density of the image was measured before and after the wet rub test. The optical density difference, called Delta OD, was used to measure the curing effect. The higher the delta OD, the poorer the wet rub test and the curing effect.

The test results are listed in Table 2A and Table 2B.

Figure 5:
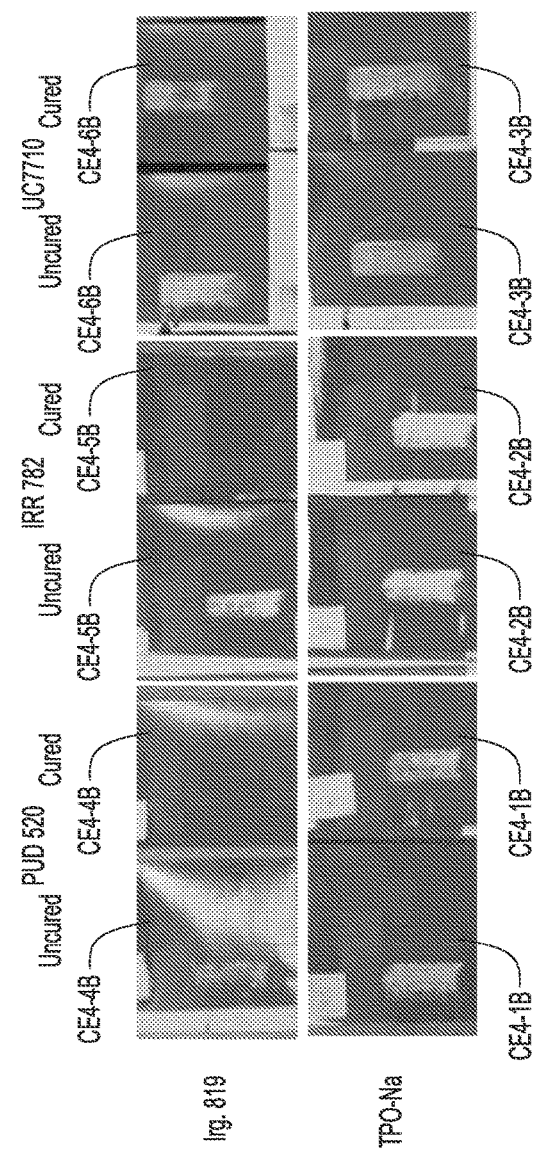
FIG. 5 is a black and white representation of a colored photograph of cured and uncured samples of six different cyan inks after a wet rub test.

With comparative examples 4-1B to 4-6B (Table 2B and FIG. 5), where there was no water soluble sensitizer in the formulations, the formulations with IRGACURE® 819 (i.e., comparative examples 4-4B, 4-5B, 4-6B) showed some curing effect on PUD 520 and IRR 782, but not much on UCECOAT® 7710, while the formulations with TPO-Na salt (i.e., comparative examples 4-1B, 4-2B, 4-3B) showed no curing effect in wet rub resistance on all the three PUDs.

Figure 4:
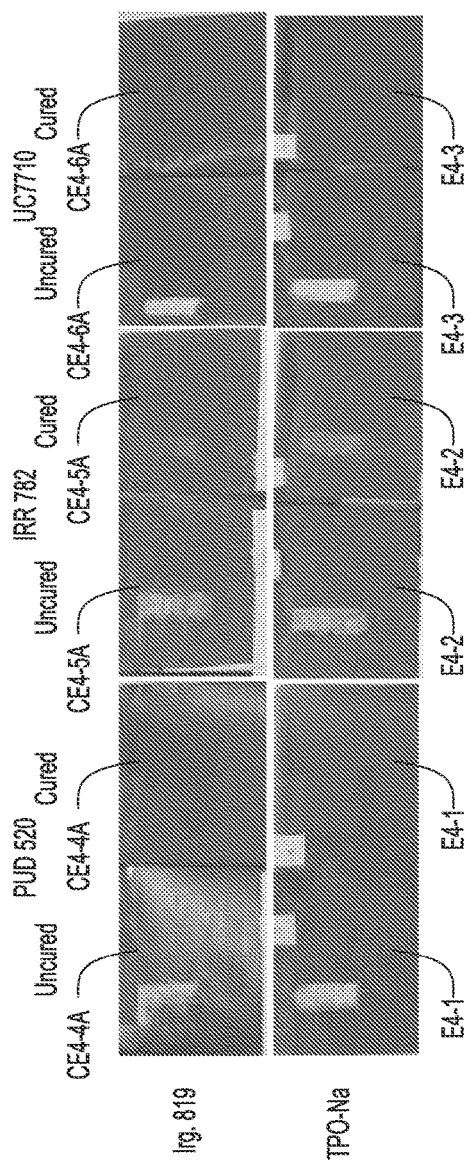
FIG. 4 is a black and white representation of a colored photograph of cured and uncured samples of six different cyan inks after a wet rub test.

However, as shown in Table 2A and FIG. 4, in the presence of the water soluble sensitizer, all the cured comparative samples (4-4A, 4-5A, 4-6A) and example samples (4-1, 4-2, 4-3) showed excellent wet rub resistance. From these results, it is clear that the combination of TPO-Na and TX-PEG-1000 (samples 4-1, 4-2, 4-3) generate a curing effect as good as IRGACURE® 819 with sensitizer (comparative examples 4-4A, 4-5A, 4-6A), while it eliminated the solubility and stability issue brought in by IRGACURE® 819.

TABLE 2A

| Test result | Example 4-1 | Example 4-2 | Example 4-3 | Comp. Example 4-4A | Comp. Example 4-5A | Comp. Example 4-6A |
|---|---|---|---|---|---|---|
| visual grade, uncured | 5.00 | 5.00 | 5.00 | 4.00 | 5.00 | 5.00 |
| visual grade, cured | 0.00 | 2.00 | 1.00 | 0.00 | 2.00 | 3.0 |
| Delta OD, uncured | 1.49 | 1.81 | 0.93 | 1.46 | 1.63 | 0.96 |
| Delta OD, cured | −0.01 | 0.32 | 0.0 | 0.13 | 0.33 | 0.07 |

TABLE 2B

| Test result | Comp. Example 4-1B | Comp. Example 4-2B | Comp. Example 4-3B | Comp. Example 4-4B | Comp. Example 4-5B | Comp. Example 4-6B |
|---|---|---|---|---|---|---|
| visual grade, uncured | 4.50 | 5.00 | 5.00 | 3.50 | 4.50 | 5.00 |
| visual grade, cured | 4.00 | 5.00 | 5.00 | 2.00 | 2.00 | 4.50 |
| Delta OD, uncured | 1.39 | 1.81 | 1.20 | 1.28 | 1.58 | 1.35 |
| Delta OD, cured | 1.44 | 1.86 | 1.01 | 0.41 | 0.5 | 1.17 |

Example 5

A black ink, a magenta ink, and a cyan ink were prepared in accordance with the examples disclosed herein. In particular, the TPO-Na of Example 1 and the water soluble polymeric sensitizer of Example 2 were incorporated into the black ink and the cyan ink. The formulations of the inks are shown in Table 3.

TABLE 3

| Ingredient | Specific component | Black Ink (wt %) | Magenta Ink (wt %) | Cyan Ink (wt %) |
|---|---|---|---|---|
| Photo-reactive binder | PUD-620 from Example 3 | 10 | 10 | 10 |
| Photoinitiator | TPO-Na | 0.5 | 0.5 | 0.5 |
| Polymeric sensitizer | TX-PEG-600 | 0.25 | 0.25 | 0.25 |
| Co-solvent | 2-hydroxyethylpyrrolidone | 10 | 10 | 10 |
| Colorant | Black pigment dispersion | 2.75 | 0 | 0 |
|  | Magenta pigment dispersion | 0 | 3 | 0 |
|  | Cyan pigment dispersion | 0 | 0 | 2.5 |
| Water |  | 76.5 | 76.25 | 76.75 |

The black and magenta inks were printed with a testbed high speed printer on an untreated, coated offset paper (Sterling Ultra Gloss (SUG) media). For the cured samples, the inks were printed, dried, and cured at a dose target of 160 mJ/cm$^2$. The printing speed (including drying and curing) was 100 fpm. For the uncured samples, the inks were also printed and dried, but not cured (i.e., the curing lamp was turned off during printing).

Figure 6:
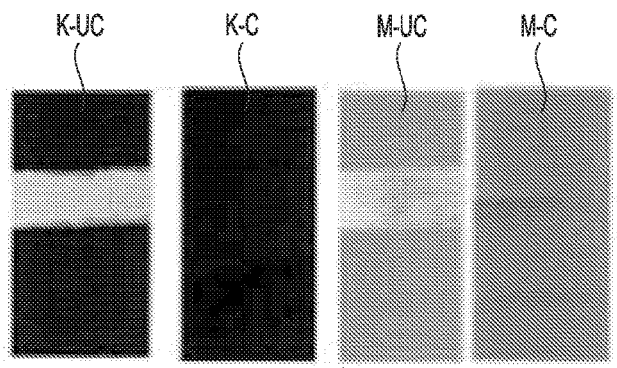
FIG. 6 is a black and white representation of a colored photograph of an uncured black ink, a cured black ink, an uncured magenta ink, and a cured magenta ink after an immediate rub test.

The durability of the black and magenta inks (uncured and cured) was evaluated with an immediate rub test and a wet rub test. For the immediate rub test, as soon as the curing or the drying (in the case of the uncured samples) was complete, a Digital Ink Rub tester (TMI, Inc.), using a 0.25 lb. weight was put onto the print and was rubbed for 5 rub cycles at 42 cycles per minute. The immediate rub test results are shown in black and white in FIG. 6. As illustrated, both the uncured black ink (K-UC) and the uncured magenta ink (M-UC) were almost completely rubbed off at the area that was exposed to the tester. In contrast, the cured black ink (K-C) and the cured magenta ink (M-C) exhibit little to no ink loss, and thus exhibited superior durability. These results illustrate that the inks disclosed herein, when cured, are able to withstand scratching and rubbing from the printing press itself, even at high printing speeds.

Figure 7:
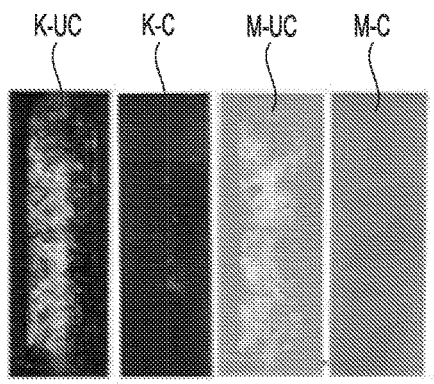
FIG. 7 is a black and white representation of a colored photograph of the uncured black ink, the cured black ink, the uncured magenta ink, and the cured magenta ink after a wet rub test.

The wet rub test was performed as described in Example 4. The wet rub test results are shown in black and white in FIG. 7. As illustrated, both the uncured black ink (K-UC) and the uncured magenta ink (M-UC) were less durable than the cured black ink (K-C) and the cured magenta ink (M-C).

The cyan ink was printed with a testbed high speed printer on an untreated, coated offset paper (Sterling Ultra Gloss (SUG) media). For the cured sample, the cyan ink was printed, dried, and cured at a dose target of 160 mJ/cm$^2$. The printing speed (including drying and curing) was 100 fpm. For the uncured sample, the cyan ink was also printed and dried, but not cured (i.e., the curing lamp was turned off during printing).

Figure 8:
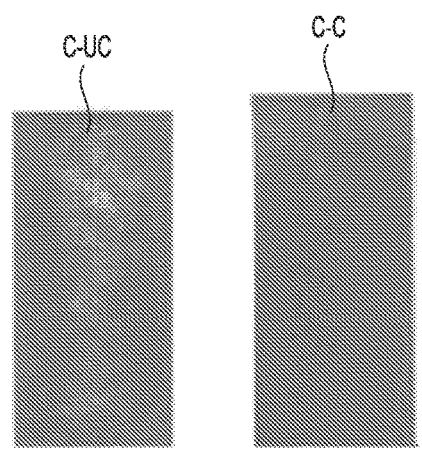
FIG. 8 is a black and white representation of a colored photograph of an uncured cyan ink and a cured cyan ink after a wet rub test.

The durability of the cyan ink (uncured and cured) was evaluated with the wet rub test. The wet rub test was performed as previously described. The optical density of the print was measured with a densitometer before and after the wet rub test. The change in optical density was calculated. The wet rub test results are shown in black and white in FIG. 8, and the optical density measurements/calculations are shown in Table 4. The cured cyan ink exhibit improved durability over the uncured cyan ink.

TABLE 4

|  | Uncured Cyan Ink | Cured Cyan Ink |
|---|---|---|
| OD (print before wet rub) | 1.17 | 1.14 |
| OD (print after wet rub) | 0.58 | 0.89 |
| ΔOD | 0.59 | 0.25 |

It is to be understood that the ranges provided herein include the stated range and any value or sub-range within the stated range. For example, a range from about 5 wt % to about 70 wt % should be interpreted to include not only the explicitly recited limits of about 5 wt % to about 70 wt %, but also to include individual values, such as 6.5 wt %, 10 wt %, 12.5 wt %, 55 wt %, etc., and sub-ranges, such as from about 12 wt % to about 60 wt %, from about 25 wt % to about 50 wt %, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A photo curable ink composition, comprising:
a photo-reactive binder;
a water soluble polymeric sensitizer, including:
a functionalized anthrone moiety having a formula (A) of:

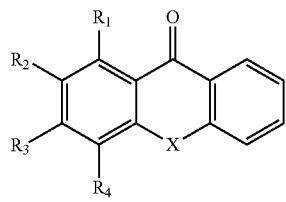

wherein:
$R_1$, $R_2$, $R_3$, and $R_4$ are each independently selected from the group consisting of a hydrogen atom, a substituted or unsubstituted alkyl group, a substituted or unsubstituted allyl group, a substituted or unsubstituted alkene or alkenyl group, a substituted or unsubstituted aryl group, a substituted or unsubstituted aralkyl group, a halogen atom, $-NO_2$, $-O-R_d$, $-CO-R_d$, $-CO-O-R_d$, $-O-CO-R_d$, $-CO-NR_dR_e$, $-NR_dR_e$, $-NR_d-CO-R_e$, $-NR_d-CO-O-R_e$, $-NR_d-CO-NR_eR_f$, $-SR_d$, $-SO-R_d$, $-SO_2-R_d$, $-SO_2-O-R_d$, $-SO_2NR_dR_e$, and a perfluoroalkyl group;
$R_d$, $R_e$, and $R_f$ are each independently selected from the group consisting of a hydrogen atom, a substituted or unsubstituted alkyl group, a substituted or unsubstituted allyl group, a substituted or unsubstituted alkene or alkenyl group, a substituted or unsubstituted aryl group, and a substituted or unsubstituted aralkyl group; and
X is O or NH;
a polyether chain; and
an amide linkage or an ether linkage attaching one end of the polyether chain to the functionalized anthrone moiety;
a water soluble photoinitiator having a formula (I) of:

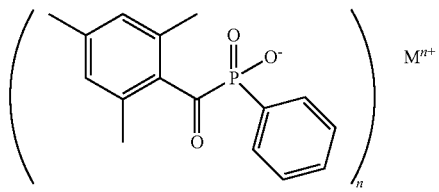

wherein n is any integer from 1 to 5 and M is a metal with a valence from 1 to 5;
a colorant; and
a balance of water.

2. The photo curable ink composition as defined in claim 1 wherein M is selected from the group consisting of Li, Na, K, Cs, Rb, Be, Mg, Ca, Ba, Al, Ge, Sn, Pb, As, and Sb.

3. The photo curable ink composition as defined in claim 1 wherein the water soluble polymeric sensitizer has a formula (III) of:

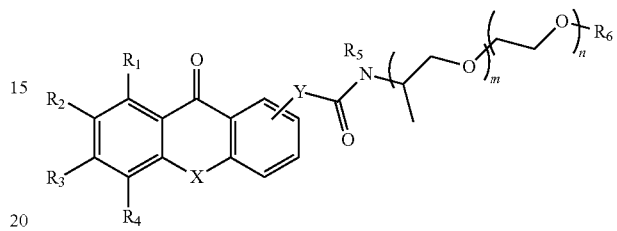

and wherein:
$R_1$, $R_2$, $R_3$, $R_4$, $-R_5$, and $R_6$ are each independently selected from the group consisting of a hydrogen atom, a substituted or unsubstituted alkyl group, a substituted or unsubstituted allyl group, a substituted or unsubstituted alkene or alkenyl group, a substituted or unsubstituted aryl group, a substituted or unsubstituted aralkyl group, a halogen atom, $-NO_2$, $-O-R_d$, $-CO-R_d$, $-CO-O-R_d$, $-O-CO-R_d$, $-CO-NR_dR_e$, $-NR_dR_e$, $-NR_d-CO-R_e$, $-NR_d-CO-O-R_e$, $-NR_d-CO-NR_eR_f$, $-SR_d$, $-SO-R_d$, $-SO_2-R_d$, $-SO_2-O-R_d$, $-SO_2NR_dR_e$ and a perfluoroalkyl group;
$R_d$, $R_e$, and $R_f$ are each independently selected from the group consisting of a hydrogen atom, a substituted or unsubstituted alkyl group, a substituted or unsubstituted allyl group, a substituted or unsubstituted alkene or alkenyl group, a substituted or unsubstituted aryl group, and a substituted or unsubstituted aralkyl group;
Y is a bond, $(CH_2)_q$, or $O(CH_2)_q$, wherein q is any integer from 1 to 100;
X is O, or NH;
m ranges from 1 to 200; and
n ranges from 1 to 200.

4. The photo curable ink composition as defined in claim 1, further comprising an additional functionalized anthrone moiety attached to an opposed end of the polyether chain through an additional ether linkage or an additional amide linkage.

5. The photo curable ink composition as defined in claim 4 wherein:
the water soluble polymeric sensitizer has a formula (IV) of:

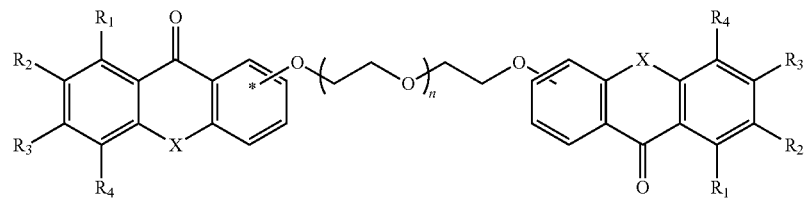

and wherein:

$R_1$, $R_2$, $R_3$, and $R_4$, are each independently selected from the group consisting of a hydrogen atom, a substituted or unsubstituted alkyl group, a substituted or unsubstituted allyl group, a substituted or unsubstituted alkene or alkenyl group, a substituted or unsubstituted aryl group, a substituted or unsubstituted aralkyl group, a halogen atom, $-NO_2$, $-O-R_d$, $-CO-R_d$, $-CO-O-R_d$, $-O-CO-R_d$, $-CO-NR_dR_e$, $-NR_dR_e$, $-NR_d-CO-R_e$, $-NR_d-CO-O-R_e$, $-NR_d-CO-NR_eR_f$, $-SR_d$, $-SO-R_d$, $-SO_2-R_d$, $-SO_2-O-R_d$, $-SO_2NR_dR_e$ and a perfluoroalkyl group;

$R_d$, $R_e$, and $R_f$ are each independently selected from the group consisting of a hydrogen atom, a substituted or unsubstituted alkyl group, a substituted or unsubstituted allyl group, a substituted or unsubstituted alkene or alkenyl group, a substituted or unsubstituted aryl group, and a substituted or unsubstituted aralkyl group;

X is O, or NH; and n ranges from 1 to 200.

6. The photo curable ink composition as defined in claim 4 wherein:

the water soluble polymeric sensitizer has a formula (V) of:

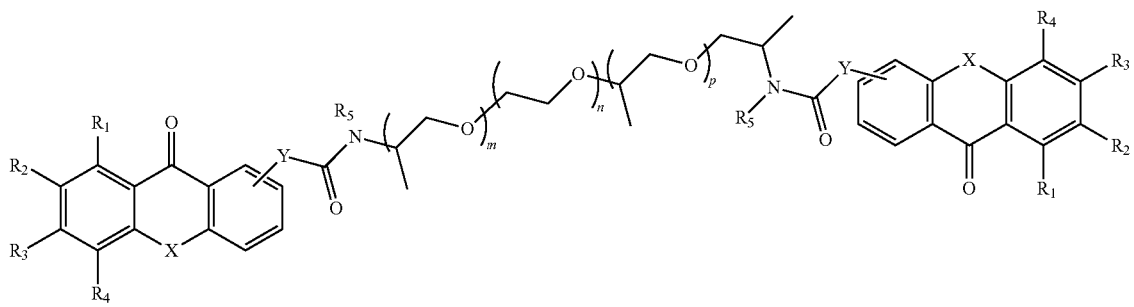

and wherein:

$R_1$, $R_2$, $R_3$, $R_4$, and $R_5$ are each independently selected from the group consisting of a hydrogen atom, a substituted or unsubstituted alkyl group, a substituted or unsubstituted allyl group, a substituted or unsubstituted alkene or alkenyl group, a substituted or unsubstituted aryl group, a substituted or unsubstituted aralkyl group, a halogen atom, $-NO_2$, $-O-R_d$, $-CO-R_d$, $-CO-O-R_d$, $-O-CO-R_d$, $-CO-NR_dR_e$, $-NR_dR_e$, $-NR_d-CO-R_e$, $-NR_d-CO-O-R_e$, $-NR_d-CO-NR_eR_f$, $-SR_d$, $-SO-R_d$, $-SO_2-R_d$, $-SO_2-O-R_d$, $-SO_2NR_dR_e$ and a perfluoroalkyl group;

$R_d$, $R_e$, and $R_f$ are each independently selected from the group consisting of a hydrogen atom, a substituted or unsubstituted alkyl group, a substituted or unsubstituted allyl group, a substituted or unsubstituted alkene or alkenyl group, a substituted or unsubstituted aryl group, and a substituted or unsubstituted aralkyl group;

X is O, or NH;

Y is a bond, $(CH_2)_q$, or $O(CH_2)_q$, wherein q is any integer from 1 to 100;

m ranges from 1 to 200;

n ranges from 1 to 200; and p ranges from 1 to 200.

7. The photo curable ink composition as defined in claim 1 wherein:

the polyether chain is a first polyether chain;

the water soluble polymeric sensitizer further comprises:
    second and third polyether chains; and
    second and third functionalized anthrone moieties;

the second polyether chain is attached to an opposed end of the first polyether chain and the second functionalized anthrone moiety is attached to the second polyether chain through a second amide linkage or a second ether linkage; and the third polyether chain is attached to the opposed end of the first polyether chain and the third functionalized anthrone moiety is attached to the third polyether chain through a third amide linkage or a third ether linkage.

8. The photo curable ink composition as defined in claim 7 wherein the water soluble polymeric sensitizer has a formula selected from the group consisting of:

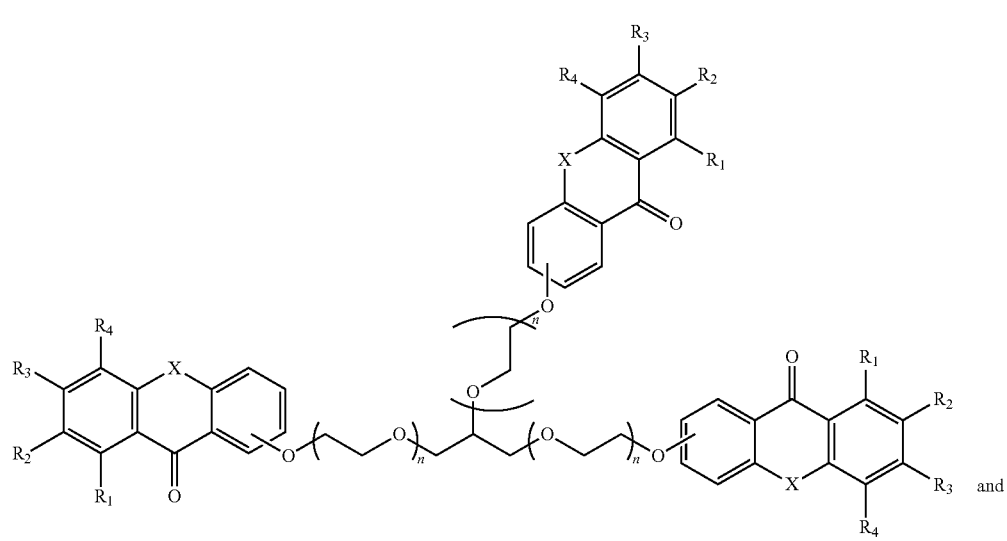

wherein for each of formula (VI) and (VII):
  R₁, R₂, R₃, and R₄, are each independently selected from the group consisting of a hydrogen atom, a substituted or unsubstituted alkyl group, a substituted or unsubstituted allyl group, a substituted or unsubstituted alkene or alkenyl group, a substituted or unsubstituted aryl group, a substituted or unsubstituted aralkyl group, a halogen atom, —NO₂, —O—R_d, —CO—R_d, —CO—O—R_d, —O—CO—R_d, —CO—NR_dR_e, —NR_dR_e, —NR_d—CO—R_e, —NR_d—CO—O—R_e, —NR_d—CO—NR_eR_f, —SR_d, —SO—R_d, —SO₂—R_d, —SO₂—R_d, —SO₂NR_dR_e and a perfluoroalkyl group;
  R_d, R_e, and R_f are each independently selected from the group consisting of a hydrogen atom, a substituted or unsubstituted alkyl group, a substituted or unsubstituted allyl group, a substituted or unsubstituted alkene or alkenyl group, a substituted or unsubstituted aryl group, and a substituted or unsubstituted aralkyl group;
  X is O, or NH; and
  n ranges from 1 to 200; and
  wherein for formula (VII) Y is a bond, (CH₂)_q, or O(CH₂)_q, wherein q is any integer from 1 to 100.

9. The photo curable ink composition as defined in claim 7, further comprising:
  a fourth polyether chain attached to the opposed end of the first polyether chain; and
  a fourth functionalized anthrone moiety attached to the fourth polyether chain through a fourth amide linkage or a fourth ether linkage.

10. The photo curable ink composition as defined in claim 9 wherein the water soluble polymeric sensitizer has a formula selected from the group consisting of:

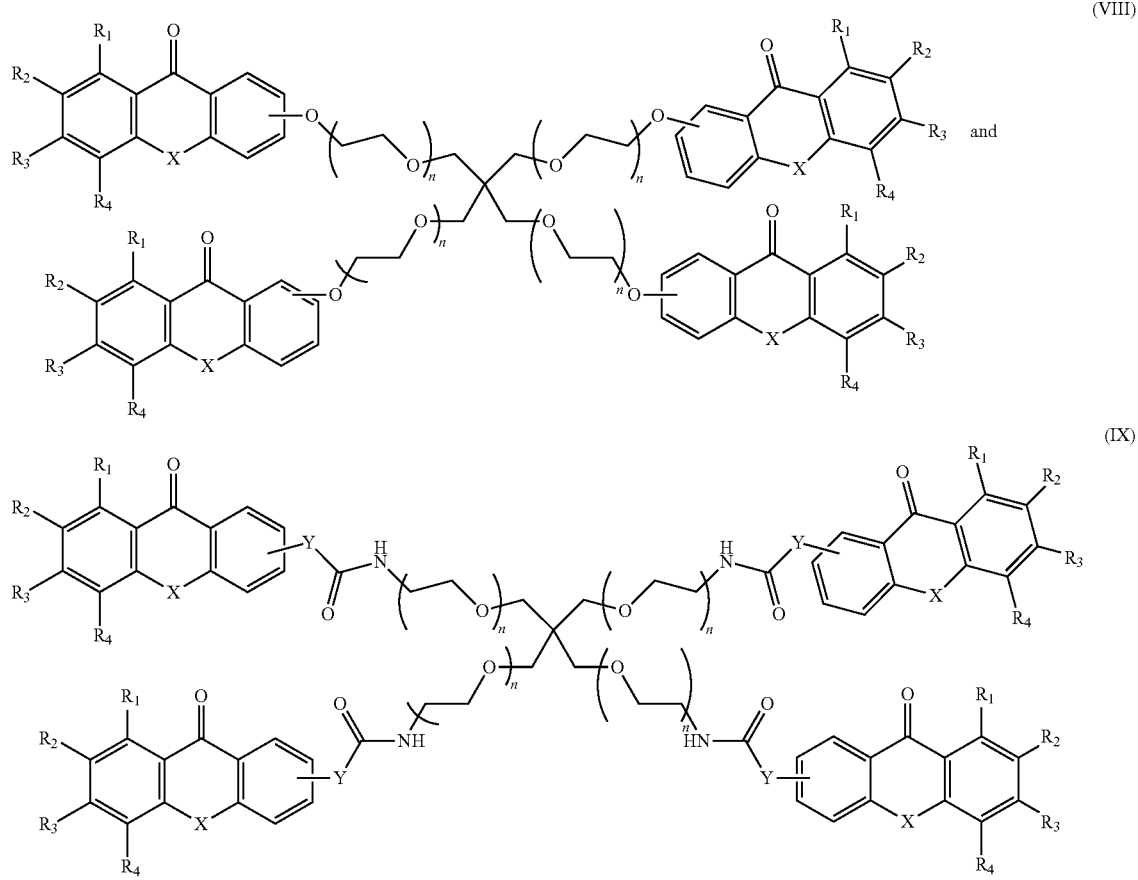

wherein for each of formula (VIII) and (IX):

$R_1$, $R_2$, $R_3$, and $R_4$, are each independently selected from the group consisting of a hydrogen atom, a substituted or unsubstituted alkyl group, a substituted or unsubstituted allyl group, a substituted or unsubstituted alkene or alkenyl group, a substituted or unsubstituted aryl group, a substituted or unsubstituted aralkyl group, a halogen atom, $-NO_2$, $-O-R_d$, $-CO-R_d$, $-CO-O-R_d$, $-O-CO-R_d$, $-CO-NR_dR_e$, $-NR_dR_e$, $-NR_d-CO-R_e$, $-NR_d-CO-O-R_e$, $-NR_d-CO-NR_eR_f$, $-SR_d$, $-SO-R_d$, $-SO_2-R_d$, $-SO_2-O-R_d$, $-SO_2NR_dR_e$ and a perfluoroalkyl group;

$R_d$, $R_e$, and $R_f$ are each independently selected from the group consisting of a hydrogen atom, a substituted or unsubstituted alkyl group, a substituted or unsubstituted allyl group, a substituted or unsubstituted alkene or alkenyl group, a substituted or unsubstituted aryl group, and a substituted or unsubstituted aralkyl group;

X is O, or NH; and n ranges from 1 to 200; and wherein for formula (IX) Y is a bond, $(CH_2)_q$, or $O(CH_2)_q$, wherein q is any integer from 1 to 100.

11. The photo curable ink composition as defined in claim 1, further comprising a water soluble organic solvent.

12. The photo curable ink composition as defined in claim 1 wherein each of the water soluble polymeric sensitizer and the water soluble photoinitiator is stable in water at a pH ranging from greater than 7 to about 14.

13. The photo curable ink composition as defined in claim 1 wherein:

the water soluble polymeric sensitizer is present in the photo curable ink composition in an amount ranging from about 0.1 wt % to about 10 wt % based on a total wt % of the photo curable ink composition; and the water soluble photoinitiator is present in the photo curable ink composition in an amount ranging from about 0.1 wt % to about 10 wt % based on a total wt % of the photo curable ink composition.

14. A photo curable ink composition, comprising:

a photo-reactive binder;

a water soluble photoinitiator having a formula (I) of:

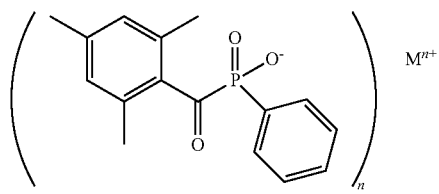

wherein n is any integer from 1 to 5 and M is a metal with a valence from 1 to 5;

a water soluble polymeric sensitizer having a formula (II) of:

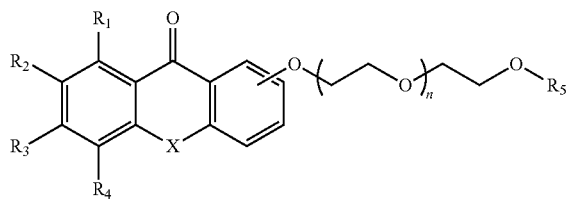

wherein:
R₁, R₂, R₃, R₄, and R₅ are each independently selected from the group consisting of a hydrogen atom, a substituted or unsubstituted alkyl group, a substituted or unsubstituted allyl group, a substituted or unsubstituted alkene or alkenyl group, a substituted or unsubstituted aryl group, a substituted or unsubstituted aralkyl group, a halogen atom, —NO₂, —O—R_d, —CO—R_d, —CO—O—R_d, —O—CO—R_d, —CO—NR_dR_e, —NR_dR_e, —NR_d—CO—R_e, —NR_d—CO—O—R_e, —NR_d—CO—NR_eR_f, —SR_d, —SO—R_d, —SO₂—R_d, —SO₂—O—R_d, —SO₂NR_dR_e and a perfluoroalkyl group;

R_d, R_e, and R_f are each independently selected from the group consisting of a hydrogen atom, a substituted or unsubstituted alkyl group, a substituted or unsubstituted allyl group, a substituted or unsubstituted alkene or alkenyl group, a substituted or unsubstituted aryl group, and a substituted or unsubstituted aralkyl group;

X is O, S, or NH; and n ranges from 1 to 200;

a colorant; and a balance of water.

15. The photo curable ink composition as defined in claim 14 wherein M is selected from the group consisting of Li, Na, K, Cs, Rb, Be, Mg, Ca, Ba, Al, Ge, Sn, Pb, As, and Sb.

16. The photo curable ink composition as defined in claim 14, further comprising a water soluble organic solvent.

17. The photo curable ink composition as defined in claim 14 wherein each of the water soluble polymeric sensitizer and the water soluble photoinitiator is stable in water at a pH ranging from greater than 7 to about 14.

18. The photo curable ink composition as defined in claim 14 wherein:
the water soluble polymeric sensitizer is present in the photo curable ink composition in an amount ranging from about 0.1 wt % to about 10 wt % based on a total wt % of the photo curable ink composition; and
the water soluble photoinitiator is present in the photo curable ink composition in an amount ranging from about 0.1 wt % to about 10 wt % based on a total wt % of the photo curable ink composition.

19. A photo curable ink composition, comprising:
a photo-reactive binder;
a water soluble polymeric sensitizer, including:
a functionalized anthrone moiety;
a polyether chain; and
an amide linkage attaching one end of the polyether chain to the functionalized anthrone moiety;

a water soluble photoinitiator having a formula (I) of:

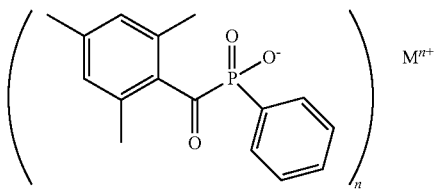

wherein n is any integer from 1 to 5 and M is a metal with a valence from 1 to 5;
a colorant; and
a balance of water.

20. A method of making a photo curable ink, comprising:
obtaining a water soluble photoinitiator having a formula (I) of:

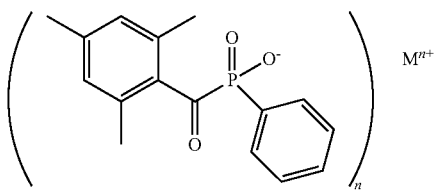

wherein n is any integer from 1 to 5 and M is a metal with a valence from 1 to 5; and
mixing the water soluble photoinitiator with a photo-reactive binder, a colorant, a co-solvent, water, and a water soluble polymeric sensitizer, including:
a functionalized anthrone moiety having a formula (A) of:

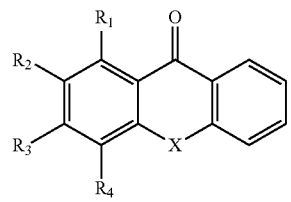

wherein:
R₁, R₂, R₃, and R₄ are each independently selected from the group consisting of a hydrogen atom, a substituted or unsubstituted alkyl group, a substituted or unsubstituted allyl group, a substituted or unsubstituted alkene or alkenyl group, a substituted or unsubstituted aryl group, a substituted or unsubstituted aralkyl group, a halogen atom, —NO₂, —O—R_d, —CO—R_d, —CO—O—R_d, —O—CO—R_d, —CO—NR_dR_e, —NR_dR_e, —NR_d—CO—R_e, —NR_d—CO—O—R_e, —NR_d—CO—NR_eR_f, —SR_d, —SO—R_d, —SO₂—R_d, —SO₂—O—R_d, —SO₂NR_dR_e, and a perfluoroalkyl group;

R_d, R_e, and R_f are each independently selected from the group consisting of a hydrogen atom, a substituted or unsubstituted alkyl group, a substituted or unsubstituted allyl group, a substituted or unsubstituted alkene or alkenyl group, a substituted or unsubstituted aryl group, and a substituted or unsubstituted aralkyl group; and X is O or NH;

a polyether chain; and an amide linkage or an ether linkage attaching one end of the polyether chain to the functionalized anthrone moiety.

* * * * *